(12) United States Patent
Byman-Kivivuori et al.

(10) Patent No.: US 7,580,678 B2
(45) Date of Patent: Aug. 25, 2009

(54) SYSTEM, APPARATUS, AND METHOD FOR EFFECTING NETWORK CONNECTIONS VIA WIRELESS DEVICES USING RADIO FREQUENCY IDENTIFICATION

(75) Inventors: Birgit Byman-Kivivuori, Espoo (FI); Heikki Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 668 days.

(21) Appl. No.: 10/600,011

(22) Filed: Jun. 19, 2003

(65) Prior Publication Data

US 2004/0002305 A1 Jan. 1, 2004

Related U.S. Application Data

(63) Continuation-in-part of application No. 10/180,267, filed on Jun. 26, 2002.

(51) Int. Cl.
*H04B 7/00* (2006.01)
(52) U.S. Cl. .................. 455/41.2; 455/456.1; 455/517
(58) Field of Classification Search ................ 455/41.2, 455/558, 456.1, 517
See application file for complete search history.

(56) References Cited

U.S. PATENT DOCUMENTS

| | | | |
|---|---|---|---|
| 5,415,167 A | 5/1995 | Wilk | |
| 5,426,594 A | 6/1995 | Wright et al. | |
| 5,463,696 A | 10/1995 | Beernink et al. | |
| 5,478,989 A | 12/1995 | Shepley | |
| 5,499,294 A | 3/1996 | Friedman | |
| 5,508,695 A | 4/1996 | Nelson et al. | |
| 5,513,117 A | 4/1996 | Small | |
| 5,550,535 A | 8/1996 | Park | |
| 5,592,375 A | 1/1997 | Salmon et al. | |
| 5,629,981 A | 5/1997 | Nerlikar | |
| 5,649,296 A * | 7/1997 | MacLellan et al. ............ 455/39 |

(Continued)

FOREIGN PATENT DOCUMENTS

DE 296 13 393 U1 12/1997

(Continued)

OTHER PUBLICATIONS

Radio Frequency Identification—A basic primer, Version 1.11, Sep. 28, 1999, http://www.aimglobal.org/technologies/rfid/resources/papers/rfid_basics_primer.htm (Printed from internet Jun. 26, 2002).

(Continued)

*Primary Examiner*—Creighton Smith
(74) *Attorney, Agent, or Firm*—Hollingsworth & Funk, LLC

(57) ABSTRACT

A system, apparatus, and method for facilitating the initiation/execution of mobile services using radio frequency transponders. Transponders or "tags" having information associated therewith are provided at a location accessible to a mobile device user. A visual representation is associated with each of the transponders, where each visual representation corresponds to a communication function to be performed. A transponder is activated via a wireless signal transmitted by the mobile device in response to the mobile device being positioned proximate the visual representation associated with the transponder. The information from the activated transponder is received at the mobile device, which in turn invokes a mobile device application identified at least in part by the information received by the mobile device. The function corresponding to the visual representation is performed in response to invoking the mobile device application.

50 Claims, 12 Drawing Sheets

U.S. PATENT DOCUMENTS

| | | | |
|---|---|---|---|
| 5,682,024 | A | 10/1997 | Koopman et al. |
| 5,682,142 | A | 10/1997 | Loosmore et al. |
| 5,740,538 | A | 4/1998 | Joyce et al. |
| 5,771,283 | A | 6/1998 | Chang et al. |
| 5,794,142 | A | 8/1998 | Vanttila et al. |
| 5,821,513 | A | 10/1998 | O'Hagan et al. |
| 5,886,646 | A | 3/1999 | Wantanabe et al. |
| 5,926,133 | A | 7/1999 | Green |
| 5,949,335 | A | 9/1999 | Maynard |
| 5,959,530 | A | 9/1999 | Lupien, Jr. et al. |
| 6,018,774 | A | 1/2000 | Mayle et al. |
| 6,055,442 | A | 4/2000 | Dietrich |
| 6,177,860 | B1 | 1/2001 | Cromer et al. |
| 6,185,426 | B1 | 2/2001 | Alperovich et al. |
| 6,246,882 | B1* | 6/2001 | Lachance ................. 455/456.4 |
| 6,259,367 | B1 | 7/2001 | Klein |
| 6,259,923 | B1 | 7/2001 | Lim et al. |
| 6,269,446 | B1 | 7/2001 | Schumacher et al. |
| 6,295,506 | B1 | 9/2001 | Heinonen et al. |
| 6,370,389 | B1 | 4/2002 | Isomursu et al. |
| 6,370,568 | B1 | 4/2002 | Garfinkle |
| 6,400,272 | B1 | 6/2002 | Holtzman et al. |
| 6,424,838 | B1 | 7/2002 | Stobbe et al. |
| 6,446,208 | B1 | 9/2002 | Gujar et al. |
| 6,574,604 | B1 | 6/2003 | van Rijn |
| 6,577,901 | B2 | 6/2003 | Thompson |
| 6,624,752 | B2* | 9/2003 | Klitsgaard et al. ....... 340/572.1 |
| 6,732,152 | B2 | 5/2004 | Lockhart et al. |
| 6,795,711 | B1 | 9/2004 | Sivula |
| 6,816,725 | B1 | 11/2004 | Lemke et al. |
| 6,839,022 | B1 | 1/2005 | Benco et al. |
| 6,868,340 | B2 | 3/2005 | Alexander et al. |
| 6,912,398 | B1* | 6/2005 | Domnitz ..................... 455/461 |
| 2001/0016479 | A1* | 8/2001 | Wood, Jr. ................. 455/277.1 |
| 2001/0051876 | A1 | 12/2001 | Seigel et al. |
| 2002/0008622 | A1 | 1/2002 | Weston et al. |
| 2002/0065680 | A1 | 5/2002 | Kojima et al. |
| 2002/0070862 | A1 | 6/2002 | Francis et al. |
| 2002/0082001 | A1 | 6/2002 | Tanaka et al. |
| 2002/0101519 | A1 | 8/2002 | Myers |
| 2002/0111164 | A1* | 8/2002 | Ritter ......................... 455/426 |
| 2002/0130178 | A1 | 9/2002 | Wan et al. |
| 2002/0131565 | A1 | 9/2002 | Scheuring et al. |
| 2002/0132616 | A1 | 9/2002 | Ross et al. |
| 2002/0177408 | A1* | 11/2002 | Forster et al. ................. 455/41 |
| 2003/0016804 | A1 | 1/2003 | Sheha et al. |
| 2003/0017804 | A1* | 1/2003 | Heinrich et al. ............... 455/41 |
| 2003/0064685 | A1 | 4/2003 | Kim |
| 2003/0088496 | A1 | 5/2003 | Piotrowski |
| 2003/0095032 | A1 | 5/2003 | Hoshino et al. |
| 2003/0114137 | A1* | 6/2003 | Eiden et al. .................. 455/403 |
| 2003/0148774 | A1 | 8/2003 | Naghian et al. |
| 2003/0148775 | A1 | 8/2003 | Spriestersbach et al. |
| 2003/0211856 | A1 | 11/2003 | Zilliacus |
| 2003/0220835 | A1 | 11/2003 | Barnes |
| 2003/0227392 | A1 | 12/2003 | Ebert et al. |
| 2004/0002305 | A1 | 1/2004 | Byman-Kivivuori et al. |
| 2004/0015562 | A1 | 1/2004 | Harper et al. |
| 2004/0023686 | A1 | 2/2004 | King et al. |
| 2004/0025035 | A1* | 2/2004 | Jean-Claude et al. ........ 713/189 |
| 2004/0063441 | A1 | 4/2004 | Diao et al. |
| 2004/0075752 | A1 | 4/2004 | Valleriano et al. |
| 2004/0087273 | A1* | 5/2004 | Perttila et al. ............... 455/41.2 |
| 2004/0117684 | A1 | 6/2004 | Chamberlain |
| 2004/0128197 | A1 | 7/2004 | Bam et al. |
| 2004/0133524 | A1 | 7/2004 | Chamberlain |
| 2004/0147270 | A1* | 7/2004 | Petrovich ................. 455/456.3 |
| 2004/0157622 | A1 | 8/2004 | Needham |
| 2004/0185900 | A1 | 9/2004 | McElveen |
| 2004/0198309 | A1 | 10/2004 | Duvall |
| 2004/0203352 | A1* | 10/2004 | Hall et al. .................. 455/41.1 |
| 2004/0203944 | A1* | 10/2004 | Huomo et al. ............... 455/466 |
| 2005/0054351 | A1 | 3/2005 | McAlexander |
| 2005/0060299 | A1 | 3/2005 | Filley et al. |
| 2006/0128408 | A1* | 6/2006 | Perttila et al. ............... 455/466 |

FOREIGN PATENT DOCUMENTS

| | | |
|---|---|---|
| DE | 100 42 914 A1 | 4/2001 |
| EP | 0 801 512 | 10/1997 |
| JP | 2002169783 | 6/2002 |
| WO | WO 97/28736 | 8/1997 |
| WO | WO 97/46960 | 12/1997 |
| WO | WO9746960 | 12/1997 |
| WO | WO 99/17230 | 4/1999 |
| WO | WO9917230 | 4/1999 |
| WO | WO 00/74406 | 12/2000 |
| WO | WO0074406 | 12/2000 |
| WO | WO 01/06507 | 1/2001 |
| WO | WO0106507 | 1/2001 |
| WO | WO 01/17297 | 3/2001 |
| WO | WO 01/20542 | 3/2001 |
| WO | WO0117297 | 3/2001 |
| WO | WO0120542 | 3/2001 |
| WO | WO 01/73687 | 4/2001 |
| WO | WO 01/39103 | 5/2001 |
| WO | WO 01/39108 | 5/2001 |
| WO | WO0139103 | 5/2001 |
| WO | WO0139108 | 5/2001 |
| WO | WO 01/45319 | 6/2001 |
| WO | WO 01/47291 | 6/2001 |
| WO | WO0145319 | 6/2001 |
| WO | WO0147291 | 6/2001 |
| WO | WO 01/99410 | 12/2001 |
| WO | WO0199410 | 12/2001 |
| WO | WO 02/35773 | 2/2002 |
| WO | WO 03/063106 | 7/2003 |

OTHER PUBLICATIONS

Office Action dated Dec. 16, 2004 from U.S. Appl. No. 10/180,267, filed Jun. 26, 2002.

Office Action dated Sep. 1, 2005 from U.S. Appl. No. 10/180,267, filed Jun. 26, 2002.

Office Action dated May 4, 2006 from U.S. Appl. No. 10/180,267, filed Jun. 26, 2002.

Office Action dated Jan. 5, 2007 from U.S. Appl. No. 10/180,267, filed Jun. 26, 2002.

Office Action dated Feb. 21, 2008 from U.S. Appl. No. 10/180,267, filed Jun. 26, 2002.

Office Action dated Nov. 28, 2008 from U.S. Appl. No. 10/180,267, filed Jun. 26, 2002.

Want et al., "Bridging Physical and Virtual Worlds with Electronic Tags", Chi '99 Conference Proceedings Human Factors in Computing Systems, pp. 370-377, May 15-20, 1999.

* cited by examiner

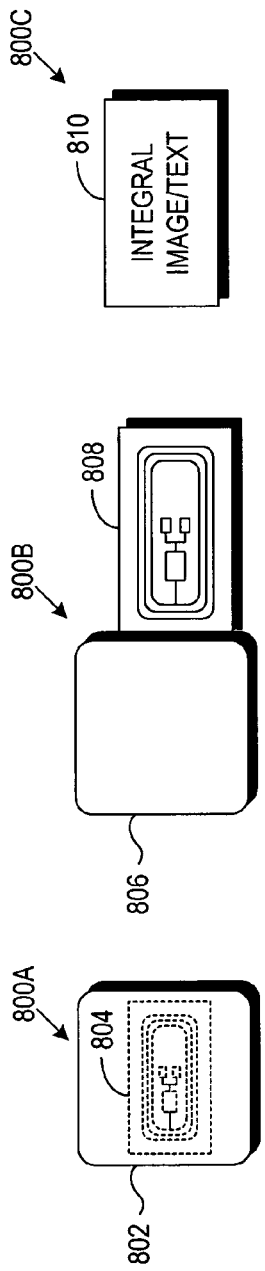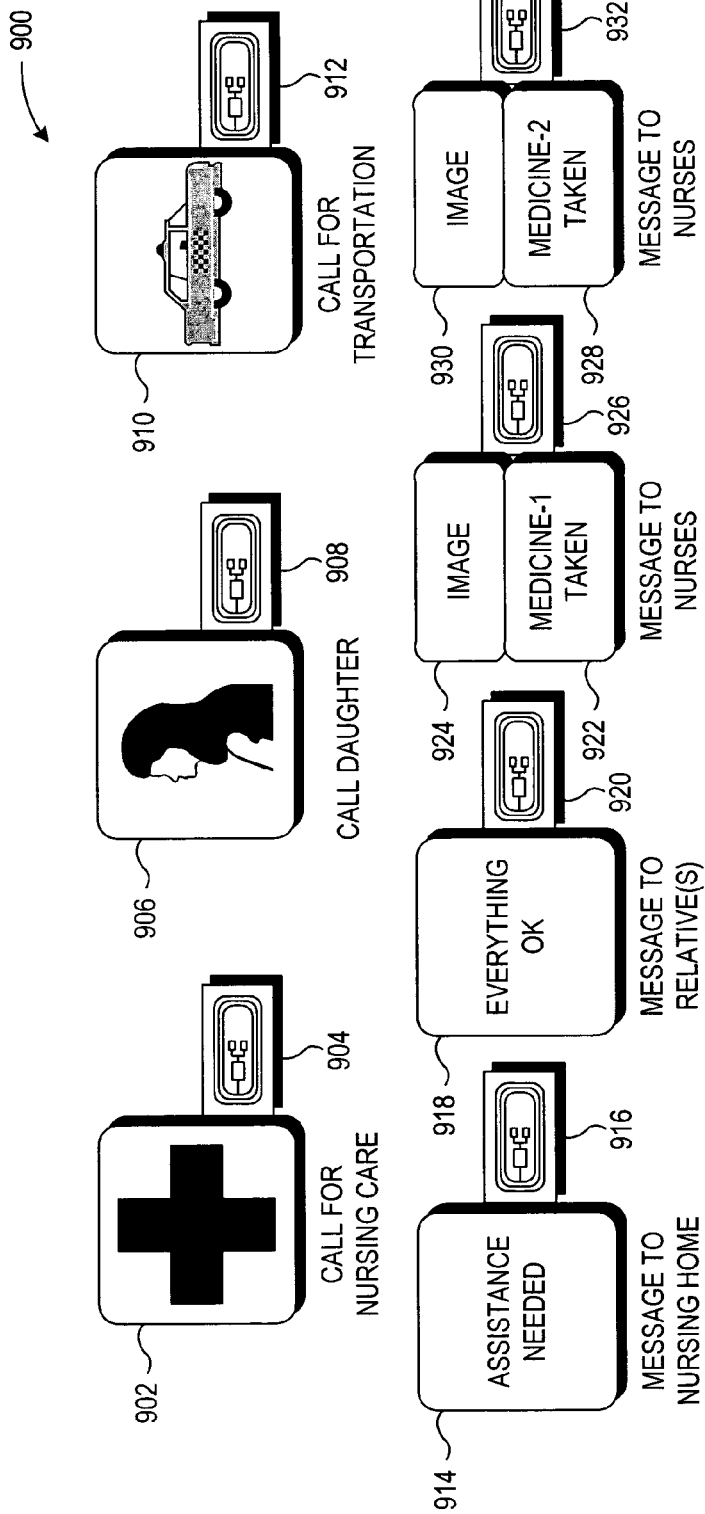

SYSTEM, APPARATUS, AND METHOD FOR EFFECTING NETWORK CONNECTIONS VIA WIRELESS DEVICES USING RADIO FREQUENCY IDENTIFICATION

REFERENCE TO PRIOR APPLICATION

This application is a continuation-in-part of prior application Ser. No. 10/180,267, filed Jun. 26, 2002, incorporated herein by reference in its entirety.

FIELD OF THE INVENTION

This invention relates in general to mobile communications, and more particularly to a system, method and apparatus for locating available information and/or establishing services/applications via mobile terminals using radio frequency identification technology.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

An incredible amount of content, application, services, etc. is already available for use on wireless devices. However, the quantity of information that will be accessible to mobile terminals will increase significantly in the coming years, as further technological advances will continue to diminish the gap between desktop and wireless units. While access to this plethora of information is exciting to the mobile world, locating the desired information and utilizing the various access methods can become burdensome to the casual mobile terminal user. In fact, current mobile data services have taken off relatively slowly, partly due to the inconvenient and complex service discovery solutions offered for users of existing mobile phones.

Current mobile data service discovery and initiation has been accomplished in a variety of ways. Browsing using the Wireless Application Protocol (WAP) generally involves starting from an operator preset service portal, and browsing forward by clicking various menus. Other current mobile data service discovery includes searching for the information required for sending messages, such as Short Message Service (SMS) messages, from various sources such as advertisements. For example, users may be required to search advertisements to find content strings and application numbers. Another existing service discovery method involves mobile terminal configuration settings. Currently, this is often performed by initiating the configuration from a web site or requesting it personally.

Furthermore, some applications or services that might be available for use on a mobile device may be of little value, until the user is physically placed in a particular location or situation where such applications and/or services may be very useful. This has led to a concept generally referred to as location-based services (LBS). However, existing LBSs generally require some form of browsing, messaging, or other specific act on the part of the user, and does not relieve the user of any of the disadvantages of the prior art listed above.

Accordingly, there is a need in the communications industry for a manner of reducing the mobile terminal users' burden of discovering and/or initiating mobile data services. The present invention significantly reduces the need for the user to sift through numerous network sites, advertisements, documents, etc. to locate services and information when the user is in a situation/location where there is a high probability that the user will want a certain type of information. The present invention also provides for ease of establishing network services. The present invention fulfills these and other needs, and offers other advantages over the prior art.

SUMMARY OF THE INVENTION

The present invention is directed to a system, apparatus, and method for facilitating the initiation/execution of mobile services using radio frequency transponders.

In accordance with one embodiment of the invention, a method is provided for initiating services via a mobile device. The method includes providing one or more transponders having information associated therewith at a location substantially accessible to a mobile device user. A visual representation is associated with each of the transponders, where each visual representation corresponds to a function to be performed. At least one of the transponders is activated via a wireless signal transmitted by the mobile device in response to the mobile device being positioned proximate the visual representation associated with the transponder. The information from the activated transponder is received at the mobile device, which in turn invokes a mobile device application identified at least in part by the information received by the mobile device. The function corresponding to the visual representation is performed in response to invoking the mobile device application.

In accordance with another embodiment of the invention, a method is provided for communicating over a network via a mobile device equipped with a radio frequency (RF) reader. The method includes identifying at least one desired communication function among one or more visually-presented communication function identifiers, where each of the visually-presented communication function identifiers is associated with at least one transponder storing information thereon. The desired communication function is selected by positioning the RF reader proximate the corresponding visually-presented communication function identifier and consequently within a transmission range of the transponder associated with the desired communication function. The stored information is received from the transponder at the mobile device via the RF reader, and at least one local application is invoked on the mobile device in response to the stored information. Communication is then facilitated with at least one destination network element over the network using a mobile service facilitated by the activated local application.

In more particular embodiments of such a method, the visually-presented communication functions are positioned within the mobile device user's residence at one or more locations available to the mobile device user. The desired communication functions may include requesting health-related assistance, where communicating with the destination network element(s) involves sending a message to, or establishing a communication session with, a designated health care facility. The communication functions may include, for example, sending a message over the network by sending an SMS message, sending an MMS message, sending a Push-to-Talk (PTT) message, or the like to the destination network element(s). The communication functions may also involve establishing connections, such as a telephony session with the destination network element. In one particular embodiment, the method further includes recognizing, at an intermediary network element, a failure of the communication with the destination network element within a designated time period or by a designated time, and communicating information by the intermediary network element to a network destination(s) indicating the failure of the communication with the destination network element.

In accordance with another embodiment of the invention, a method is provided for initiating communications via a mobile terminal. The method involves providing radio frequency identification (RFID) tags each associated with media identifying a function to be performed by each respective RFID tag. An RFID activation signal is transmitted from the mobile terminal, and at least one RFID tag is activated in response to the RFID activation signal when the RFID tag is within a radio frequency (RF) transmission range of the mobile terminal. An application identifier and content is received from the activated RFID tag at the mobile terminal when the mobile terminal is within a backscatter transmission range of the RFID tag. A local application on the mobile terminal is located using the application identifier, and the content is provided to the local application. The local application is executed using at least a portion of the content to perform the function associated with the activated RFID tag.

In more particular embodiments of such a method, the media may include any one or more of text, images, photographs, physical indicia perceivable by touch such as Braille, sound, etc. In another particular embodiment, the method further includes configuring one or more of the RFID tags to correspond to user interface elements of the mobile terminal, where the content received at the mobile terminal corresponds to content associated with the mobile terminal user interface element for which the respective RFID tag is configured. In a more particular embodiment, the RFID tags are configured to correspond to a graphical user interface (GUI) menu of the mobile terminal and/or to physical keyboard elements of the mobile terminal.

In accordance with another embodiment of the invention, a system is provided for facilitating communication over a network. The system includes one or more items each having a visual representation of an available communication function, and one or more transponders each associated with one of the items. The system also includes a mobile device operable by a user. The mobile device includes a radio frequency reader module including a transceiver to send activation signals recognizable by the transponders, and to receive at least an application identifier and content in response to one of the transponders being activated by the activation signals when the mobile device is positioned proximate the item associated with that transponder. The mobile device also includes a memory for storing local applications and a reader application, and a processor coupled to the memory and the radio frequency reader module. The processor is configured to invoke at least one of the local applications identified by the application identifier, and to provide the content to the local application as directed by the reader application. In this manner, the communication function corresponding to the item associated with the activated transponder is performed.

In accordance with another embodiment of the invention, a system is provided for facilitating communications over a network. The system includes a mobile device comprising a radio frequency (RF) reader device, a transceiver to communicate over the network, and one or more application modules. One or more items each having a visual representation of an available communication function are also provided. The system further includes one or more transponders each positioned proximate one of the items, where each of the transponders includes an antenna circuit to communicate at least an application identifier to the RF reader device in response to receipt of a triggering signal from the RF reader device when positioned proximate one of the items and within an RF transmission range of a corresponding one of the transponders. The RF reader device receives the communicated application identifier, and in response, the mobile device activates the application module identified by the application identifier to perform the communication function.

In accordance with another embodiment of the invention, a transponder device is provided for use with mobile devices having a radio frequency (RF) reader device. The mobile devices include one or more mobile device applications each identifiable by an application identifier. The transponder device includes a visual identifier visually depicting a communication function operable via the mobile device, a memory to store information including the application identifier, and an antenna circuit. The antenna circuit receives a carrier signal from the RF reader device when the mobile device is positioned proximate the visual identifier such that the RF reader device is within an RF communication range of the transponder device, and transmits the application identifier via a backscattered signal to the RF reader device to enable the mobile device application identified by the application identifier to perform the depicted communication function.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

FIG. 8 is a block diagram illustrating representative examples in which a visual representation may be associated with one or more transponders or tags;

FIG. 9 illustrates a representative group of communication function devices that may be used, for example, by a person in their home to initiate and/or carry out wireless network communications;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

A portion of the disclosure of this patent document contains material which is subject to copyright protection. The copyright owner has no objection to the facsimile reproduction by anyone of the patent document or the patent disclosure, as it appears in the U.S. Patent & Trademark Office patent file or records, but otherwise reserves all copyright rights whatsoever.

Generally, the present invention provides an apparatus, system, and method for locating available information and services/applications, establishing network communications via mobile terminals, and facilitating receipt of other information such as configuration/provisioning information via electromagnetic/electrostatic coupling technology. In one embodiment, this electromagnetic/electrostatic coupling is implemented in the radio frequency portion of the electromagnetic spectrum, using radio frequency identification (RFID). A mobile device is equipped with an RFID reader, and transponders or "tags" are activated by radio frequency waves emitted by the mobile terminal. When activated, the tag transmits information to the mobile terminal reader. In one embodiment of the invention, the tag provides an address(es), e.g., a Uniform Resource Locator (URL), to content desired by the user. The content itself may also be provided via the tag. In this manner, "physical browsing" is facilitated where the mobile terminal user comes in proximity to a tag that provides information that would otherwise require browsing or other means for searching for such information. The invention also provides a convenient manner of provisioning mobile terminals or providing other configuration information, by providing this provisioning and/or configuration information via RFID tags. Further, the invention facilitates establishing network communications by simply touching or pointing to tags associated with defined communication functions.

Figure 1:
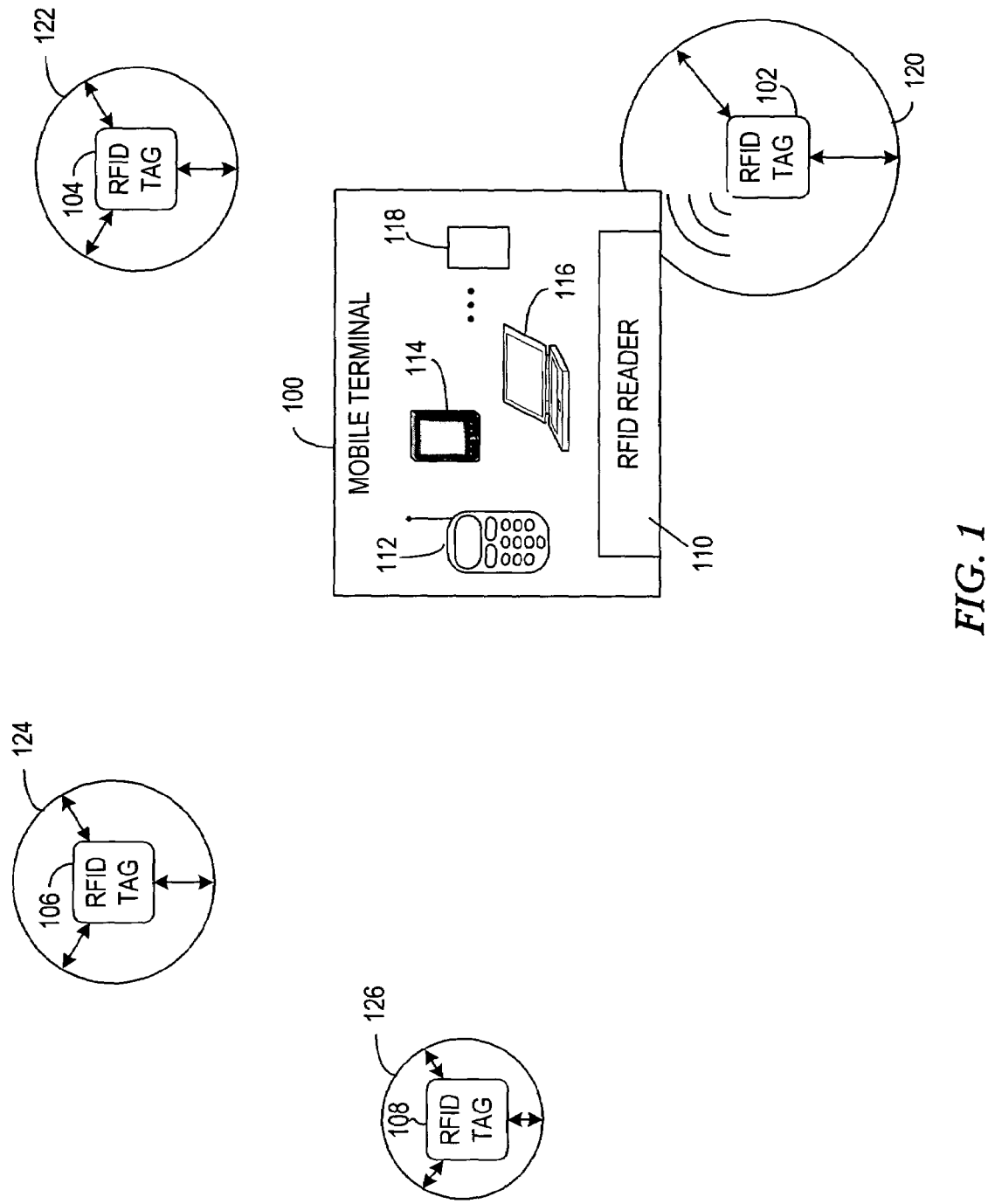
FIG. 1 is a block diagram illustrating an exemplary embodiment of the service discovery and initiation, i.e., "physical browsing," in accordance with the present invention.

FIG. 1 is a block diagram illustrating an exemplary embodiment of the service discovery and initiation, i.e., "physical browsing," in accordance with the present invention. In the illustrated embodiment, a mobile terminal 100 moves from place to place, and actions, applications, services, etc. can be initiated when the mobile terminal 100 comes within a certain range of a transponder. More particularly, one embodiment of the invention involves providing various transponders or "tags" based on radio frequency identification (RFID) technology. FIG. 1 depicts a number of such tags, namely RFID tags 102, 104, 106, 108. When the mobile terminal 100 comes within a certain range of a tag, the RFID reader 110 associated with the mobile terminal will read the information from the respective RFID tag. Any type of wireless/mobile terminal 100 equipped with an RFID reader 110 in accordance with the present invention may be used, such as a cellular telephone 112, a personal digital assistant (PDA) 114, a notebook or laptop computer 116, or any other type of wireless terminal represented by device 118 equipped with an RF reader 110.

RFID technology utilizes electromagnetic or electrostatic coupling in the radio frequency (RF) portion of the electromagnetic spectrum. The RFID reader 110 includes at least an antenna and transceiver (not shown in FIG. 1). An RF signal is transmitted from the RFID reader 110 that activates the tags 102, 104, 106, 108 when touched to, or within a predetermined range of, the tags. When a tag has been activated, it transmits information back to the RFID reader 110. More particularly, in the case of a passive tag (described below), the tag may be energized by a time-varying electromagnetic RF wave generated by the RFID reader 110. When the RF field passes through the antenna coil associated with the tag, a voltage is generated across the coil. This voltage is ultimately used to power the tag, and make possible the tag's return transmission of information to the reader, sometimes referred to as backscattering.

Using this information, the RFID reader 110 can direct the mobile terminal 100 to perform an action identified from the received information. One advantage of RFID is that it does not require direct contact, although direct contact with an RFID tag can occur, and in some instances may be required. The frequency employed will at least partially dictate the transmission range of the reader/tag link. The required proximity of the mobile terminal 100 to a tag can range from a very short range (touching or near touching) to many meters, depending on the frequency employed and the power output. Each of the RFID tags shown in FIG. 1 illustrate a range for that RFID tag. For example, when the mobile terminal comes within a range 120 of RFID tag 102, the tag 102 can receive the signal from the RFID reader 110 and respond with the desired information. Other ranges 122, 124, 126 are illustrated for RFID tags 104, 106, 108 respectively.

It should also be noted that one embodiment of the invention involves a tag having substantially no transmission range, but rather may include contacts that physically couple to corresponding contacts on the mobile terminal 100. While such an embodiment will be unable to avail itself of some of the benefits of RFID or other analogous technology, such an embodiment is feasible in connection with the present invention.

Any type of RFID tag may be used in connection with the present invention. For example, RFID tags can be either active or passive. Active tags require an internal battery and are often read/write tags. Passive tags do not require a dedicated power source, but rather obtain operating power generated from the reader. Further, tags may come in a variety of shapes and sizes, but are generally based on a custom designed silicon integrated circuit. Any transponder/tag may be used in connection with the present invention, and the tag type, size, etc. depends on the particular environment and purpose in which physical browsing in accordance with the invention will be employed.

Any number of such tags can be positioned at various locations in which a user may physically encounter. For example, such tags can be located at retail stores, hotels, restaurants, night clubs, bus stops, train stations and airports, offices, taxis, conference centers, etc. Any place where it is advantageous for the tag provider to provide information and/or convenient for the mobile terminal user to obtain such information is a candidate for a tag location in accordance with the present invention. For example, a restaurant may embed a tag outside its front door or in an entry door frame that provides the restaurant menu. Alternatively, the tag may provide an address, such as a Uniform Resource Locator (URL), to the restaurant's site where reservation and/or current seating wait times may be obtained. As another example, a night club may use such a tag to provide taxi service information, such as taxi service contact information, or even to initiate a taxi request. Such a tag can be attached or embedded into the night club door frame, tables, or a dedicated taxi station or kiosk located therein. The night club can provide one or more taxi service contact numbers of the best or closest taxi service.

In accordance with another embodiment, such tags may be placed in a location where the user frequents, such as the person's home, office, automobile, etc. For example, in one embodiment of the invention described more fully in connection with FIGS. 8-15, the tags may be used to easily initiate and carry out network communications simply by touching/pointing the RF reader to the desired tag which is labeled with the corresponding desired communication function. For example, an elderly person who may have difficulty initiating particular services may simply point or touch his/her RF reader-equipped mobile device to a tag defined to initiate a particular network service, such as sending an SMS/MMS message, establish a cellular connection, etc.

As can be seen from the foregoing, the possibilities for such physical browsing and/or communication initiation are virtually limitless. By utilizing physical tags in this manner, mobile terminal users are relieved of the burden of having to "electronically" browse for certain information that is likely to be associated at that physical location. For example, because essentially all restaurants have menus and possible seating wait times, it is foreseeable that a person will want to know that information while physically near the restaurant. Rather than requiring a passer-by to go into the restaurant to ask for this information, or requiring the person to electronically browse for this information via his/her wireless device, it can simply be provided at the restaurant site, i.e., the passer-by's current location. Further, users may be relieved of having to dial numbers on the mobile device, navigate through user interface screens or menus via the mobile device, etc.

Figure 2:
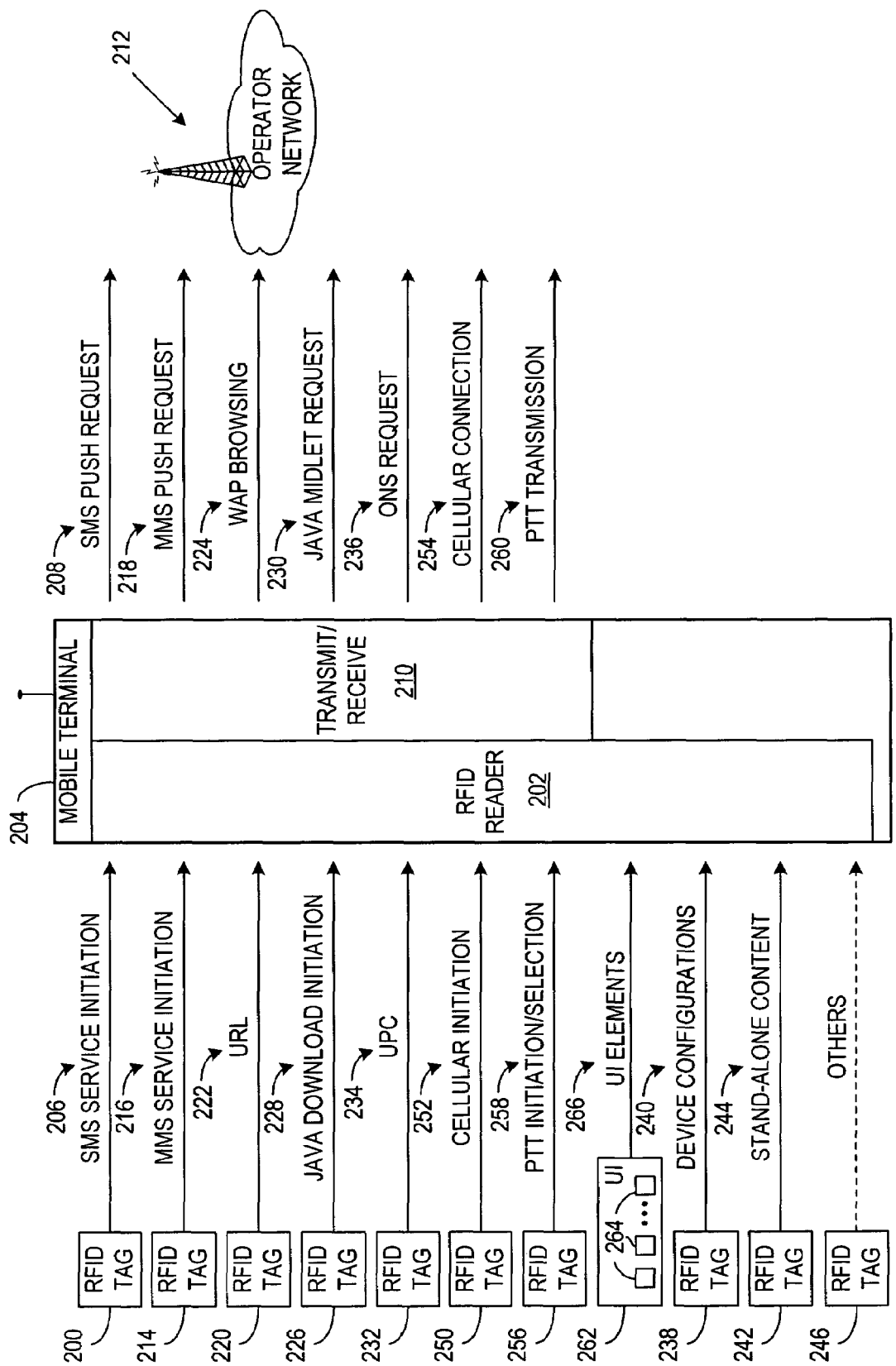
FIG. 2 illustrates a number of representative service types that may be initiated using RFID physical browsing in accordance with the present invention.

FIG. 2 illustrates a number of representative service types that may be initiated using RFID physical browsing/connection establishment in accordance with the present invention. For purposes of facilitating an understanding of this aspect of the invention, each representative service type is shown as being associated with a different RFID tag. RFID tag 200 is depicted as initiating a first service type, namely Short Messaging Service (SMS). Assuming for purposes of discussion that the tag 200 is a passive tag, the RFID reader 202 associated with the mobile terminal 204 provides a signal, and when the RFID tag 200 receives the signal, it returns an SMS service initiation response 206. As will be described more fully below, the information associated with the SMS service initiation response 206 includes an identifier to identify an application on the mobile terminal 204 to initiate, and content. A reader application in the mobile terminal 204 feeds the content portion of the tag response 206 into another application on the mobile terminal 204 based on the identifier. In this embodiment, an SMS application will be invoked, and an SMS message and premium service SMS number will be sent to the service provider, depicted by the SMS push request 208 sent via the transceiver 210 to the operator network 212.

Another representative service type that can be initiated is Multimedia Message Service (MMS). RFID tag 214 provides an MMS service initiation response 216 in the manner described above. The reader application in the mobile terminal 204 feeds the content portion of the tag response 216 to an application on the mobile terminal based on the identifier associated with the tag 214. An MMS application will be invoked, inviting a premium MMS by way of, for example, an MMS push request 218 sent to the operator network 212.

Wireless Application Protocol (WAP) browsing, or an analogous protocol facilitating mobile browsing, is another representative service type that can be initiated in accordance with the invention. As is known in the art, WAP is a set of protocols that accounts for characteristics and functionality of both Internet standards and standards for wireless services, and integrates the Internet and other networks with wireless network platforms. WAP thus bridges the gap between the wireline Internet paradigm and the wireless domain, to allow wireless device users to enjoy the benefits of the Internet across both platforms. In an embodiment where WAP browsing is the service type, the tag 220 provides an application identifier to a WAP browsing application on the mobile terminal 204, along with content including an address, e.g., URL 222. Upon invoking the WAP browser, the mobile terminal will connect to the specified URL by way of WAP browsing 224. The mobile terminal 204 may use a preset WAP gateway address to connect to the specified URL.

Another representative service type is a Java download (or analogous programming technology). The tag 226 provides a Java download initiation response 228 in response to the signal provided by the mobile terminal 204, which is read by the RFID reader 202. The RFID reader 202 provides the content portion to an application on the mobile terminal 204, ultimately leading to the transmission of a Java (for example) application request such as a Java MIDlet request 230, where a MIDlet generally refers to a small Java application (e.g., applets) that runs on compliant mobile devices. Once the Java application is downloaded, it can be executed on the mobile terminal 204. It should be recognized that the present invention is equally applicable to other analogous programming technologies, and Java is referred to herein as a representative example. Thus, as used in the specification and claims provided herein, references to Java applications are intended to include other similar programming languages that can be used on mobile terminals.

An ONS request is another example of a service type that can be initiated in accordance with the invention. An RFID tag 232 can provide content such as a Universal Product Code (UPC) 234, or an analogous code such as an Electronic Product Code (EPC). The identifier associated with the tag 232 information can initiate a program that provides a request to the operator network 212, such as an Object Naming Service (ONS) request 236. An ONS is a service available via the operator network 212 for looking up UPCs and/or EPCs from which information can then be provided. Therefore, such a request 236 will ultimately lead to the network 212 providing the requested information back to the mobile terminal.

Another representative service type that can be initiated is a cellular telephony connection. RFID tag 250 provides a cellular service initiation response 252 in the manner described above. The reader application in the mobile terminal 204 feeds any content portion of the tag response 252, such as a telephone number, to an application on the mobile terminal based on the identifier associated with the tag 250. A wireless telephony application will be invoked, ultimately establishing a cellular connection 254 via the operator network 212.

Another representative service type that can be initiated is a Push to Talk (PTT) service. PTT service, also commonly referred to as the "Push to Talk over Cellular" (PoC), provides a direct one-to-one and one-to-many voice communication service in mobile networks. It is considered to have an "always on" connection, where half-duplex communication can be initiated to both individuals and talk groups simply with the push of a button on the PTT client device. While PTT already provides ease with respect to user interface actions, menu selections may be required, and some users such as the elderly or handicapped individuals may benefit from initiating PTT communications to a particular user using the present invention. RFID tag 256 provides a PTT initiation and user destination response 258 in the manner described above. The reader application in the mobile terminal 204 feeds any content portion of the tag response 258, such as a recorded voice message, to an application on the mobile terminal based on the identifier associated with the tag 256. A PTT client application will be invoked, ultimately allowing a live or recorded PTT transmission 260 via the operator network 212.

The service types described thus far involve some communication with an operator network 212. However, the present invention is applicable to situations where no ultimate network connection is involved. RFID tag 238 illustrates one such situation, where device configurations 240 are provided to the mobile terminal 204. For example, these configurations may be initial settings for WAP, SMS, MMS, etc. or other provisioning information. For example, an RFID tag 238 may be provided to a purchaser of a mobile telephone along with the new mobile telephone. The tag 238 may be provided to the user at the time of purchase, separate from the mobile telephone packaging, as a theft-protection mechanism where the tag 238 is required to provision the mobile device. Alternatively, such a tag can be provided inside, or integral with the packaging itself. The mobile device can then be provisioned or otherwise configured for certain uses via information provided by the RFID tag 238. For example, the tag 238 identifier can identify the application on the mobile terminal 204 that is to be activated, and the content associated with the tag 238 can provide the provisioning information, which may include initial WAP, SMS, MMS, EMS, etc. information. Alternatively, the RFID tag 238 may provide a URL to direct the user to a provisioning/configuration site. Other configurations for the mobile terminal can also be provided by the tag 238. A person could purchase an RFID sticker that includes certain mobile terminal configurations, such as user profiles, wall paper, user-interface "skins," FM radio channels, Digital Video Broadcast-terrestrial (DVB-T) keys, etc.

Further, a tag 242 can similarly be used to provide stand-alone content 244 to the mobile terminal 204. This content may be, for example, text, images, business cards, etc. In one embodiment, the content is provided to the RFID reader 202 via a smart message interface, which is described more fully below. Other RFID tags 246 can be associated with other service types and provide different types of content in accordance with the principles of the present invention.

In another embodiment, built-in input devices of the mobile device user interface (UI) 262 may be replaced or augmented with a generic touching or pointing device and a number of programmable elements set in an external configuration. More particularly, the externalized UI elements may be implemented as RF tags 264, and the generic touching/pointing device may be implemented as a reader device. For example, the RF tags have digits or other indicia of the mobile phone keyboard, such as one tag corresponding to the number "1" of the keyboard; another tag corresponding to the number "2" of the keyboard, and so forth. Other UI elements such as graphical user interface (GUI) menus, icons, navigation indicia, links, and the like may also be provided via the tags 264. The tags 264 provide the designated UI elements 266 to the mobile terminal 204 where they are recognized as if the UI element had been activated via the mobile terminal itself. A more particular example is described in connection with FIG. 11.

Figure 3:
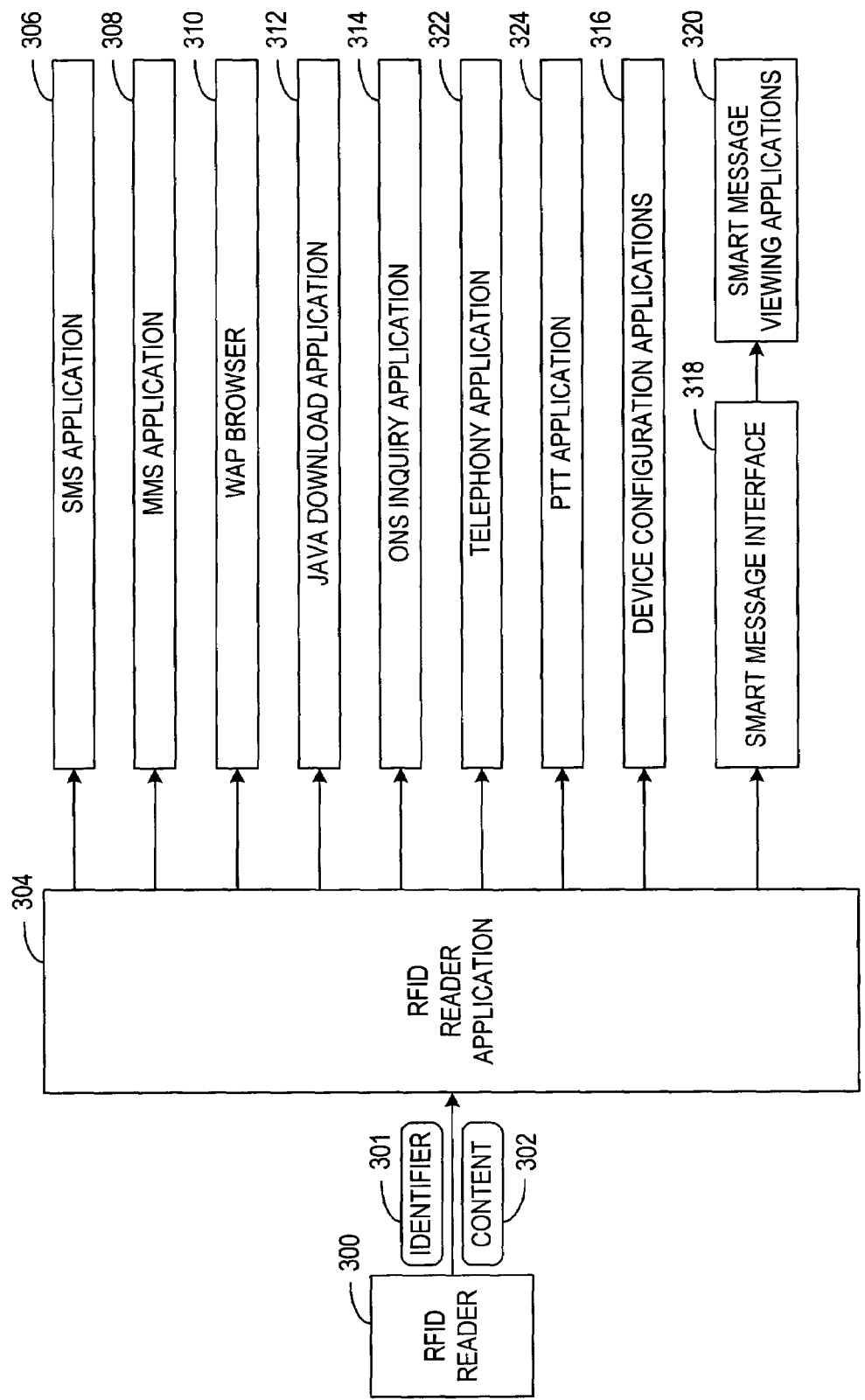
FIG. 3 is a block diagram illustrating one embodiment of a mobile terminal implementation incorporating the physical browsing principles of the present invention.

FIG. 3 is a block diagram illustrating one embodiment of a mobile terminal implementation incorporating the physical browsing principles of the present invention. The mobile terminal is equipped with an RFID reader 300, which includes at least a receiver. After transmitting a signal to activate one or more tag(s), it receives identifier and contact information from the tag. The reader 300 forwards the identifier 301 and content 302 to an RFID reader application 304. The identifier 301 is used to locate an appropriate application to initiate, and the content 302 is used by the located application. For example, the RFID reader application 304 can initiate an SMS application 306 using the identifier 301 to designate the SMS application 306. The content 302 can then be provided to the SMS application 306 for use in the appropriate manner, such as to send an SMS message and SMS service number to the operator network.

The reader application 304 can initiate a wide variety of different types of applications. Applications other than the SMS application 306 include an MMS application 308, WAP browser 310, Java download application 312, ONS inquiry application 314, device configuration applications 316, smart message interface 318 and associated viewer applications 320, cellular telephony applications 322, PTT applications 324, and the like. An MMS application 308 identified by the identifier 301 can invite a premium MMS to be provided to the mobile terminal. One manner of effecting this is to notify the mobile terminal of an MMS via an SMS message, and to have the mobile terminal read the MMS content via a WAP browser. This would invoke the WAP browser 310, which in turn initiates a WAP session at a particular URL. The WAP browser 310 would also be initiated where the identifier 301 specifies the WAP browser 310, and provides content 302 such as a URL to the WAP browser to initiate a WAP session at that URL.

A Java download application 312 can be initiated by the appropriate identifier 301, which will initiate a Java download. A number of different variations of information can be stored in the RFID tags as the content 302. More particularly, a Java program typically includes three parts, including 1) class files which are the executable bytecode of a program; 2) the dynamic state of classes (i.e., the serialized state); and 3) deployment descriptors such as Extensible Markup Language (XML) files that, for example, describe how a Java program is to be executed, etc. In a typical Java program deployment, a Java Archive (JAR) file is distributed which includes the class files and the deployment descriptors. With MIDlets, there is a separate deployment descriptor file accompanying the JAR file. The class files, dynamic class state, and deployment descriptors can be stored in RFID tags in different combinations.

As a first example, the serialized information may be included in the tag, along with the URL where the actual bytecode may be retrieved. If the URL is fixed, the same can be done with the class name as a unique identifier, with the Java Virtual Machine classloader downloading the required executable bytecode. As another example, a Java Network Launching Protocol (JNLP) file, which is a Java Webstart launch file of deployment descriptors, can be stored on the tag. The JNLP file includes a description of the program and a URL from which the class files can be downloaded. The mobile terminal can cache the class files in the event that the same program would be started again from a different RFID tag. Another example is to put the bytecode and a deployment description on the tag, possibly in a compressed format to save space. Still another example is to include the code and the serialized information on the tag. This could facilitate sharing of MIDlets between mobile terminal users.

A more particular application using a Java download application 312 is to allow MIDlets, or limited versions referred to herein as "sniplets," to be transferred freely from one mobile device to another. The sniplet itself may or may not offer much value on its own, but it can be used to enable other services. For example, a restaurant might have an RFID tag that distributes a small sniplet containing the name, address, and a menu of the restaurant. If the restaurant is a popular restaurant, people may start storing and taking the sniplets with them to distribute to others.

Such a MIDlet/sniplet can include one or both of the class code and the serialized information. Serialized data contains the class name, which is a unique identifier allowing the receiving device to download the required data from the network. For example, the restaurant sniplet may be as follows:

```
public class RestaurantSniplet extends com.nokia.sniplet.GenericSniplet
{
    String restaurantName;
    String restaurantAddress;
    String restaurantURL;
    String menu;
    public byte[ ] serialize( );
    public void unserialize( byte[ ] data );
}
```

The restaurant RFID tag may include information in serialized format such as:
  class=com.nokia.sniplet.RestaurantSniplet;
  restaurantName=Kabuki;
  menu=sushi, 5€

When the mobile terminal receives this serialized data, it will check if it already has a class called "com.nokia.sniplet.RestaurantSniplet" in memory. If it has, it can combine the class and the data into a new instance. In such a case, there is less data and thus bandwidth is saved. For example, if the information associated with one hundred restaurants was saved, the code would only need to be stored in memory once, while the dynamic data would be stored one hundred times. Storing the code only once results in a significant reduction in the required storage.

Returning to FIG. 3, the identifier 301 may also designate an ONS inquiry application 314, where the content 302 would include one or more UPCs or EPCs. In this case the mobile terminal can use, for example, a predetermined WAP gateway address to connect to a broker site where the UPC/EPC is converted to a URL that can be used to obtain information from a WAP server. The retrieved URL can then be used via a browser, such as a WAP browser. The identifier 301 may also designate a device configuration application 316 that will configure settings such as WAP/SMS/MMS settings, profiles, wallpaper, user interface skins, etc. The content 302 would provide the data corresponding to the new configuration. Similarly, the identifier 301 may also designate cellular telephony application 322, where the content 302 may include a telephone number. The identifier may also designate a Push to Talk (PTT) application 324, as well as other applications.

As previously described, RFID tags may be used to provide configuration data and/or other stand-alone content to the mobile terminal via the RFID reader 300. The identifier 301 will identify an appropriate application, which will be invoked with the assistance of the RFID reader application 304. In one exemplary embodiment, the identifier 301 designates a smart message interface 318 to be invoked, and the content 302 includes any type of content that can be accommodated by a smart message interface. As is known in the art, "smart messaging" is a concept for sending and receiving content over an over-the-air (OTA) message service such as SMS. Using the smart messaging protocol, content such as business cards (e.g., vCard), ring tones, logos, picture messages, Java MIDlets, calendar entries, network access settings, etc. can be sent OTA. Smart messaging is essentially a special type of text message having its own prefixes and codes that makes it possible for a mobile terminal to recognize the message as a functional message rather than a text message directed to the mobile terminal user.

The smart message interface 318 facilitates the proper receipt of RFID tag information provided in accordance with the smart messaging protocol. The tag contains the smart message content 302 (or other content such as EMS content). Once properly received, the mobile terminal can display the content on a local display with the assistance of one or more smart message viewing applications 320. In addition, the mobile terminal user can optionally elect to edit the content and/or forward it to others. Providing content 302 to the mobile terminal using smart messaging is advantageous as not all mobile terminal users are equipped with the physical tools (e.g., digital cameras) or skills required to create visual messages, but they can obtain them from the tags that are strategically located. For example, an RFID tag at a tourist attraction can provide an image associated with that location to the RFID reader 300 using the smart messaging (or other) protocol, thereby instantly providing the tourist with an image of vacation sites that were visited. As another example, a business executive may have an RFID tag in or near his/her office that includes a vCard that can be instantly transmitted to a visitor's mobile terminal using the smart messaging (or other) protocol. A wide variety of other applications exist as well, and the foregoing examples are intended only as representative examples.

Figure 4:
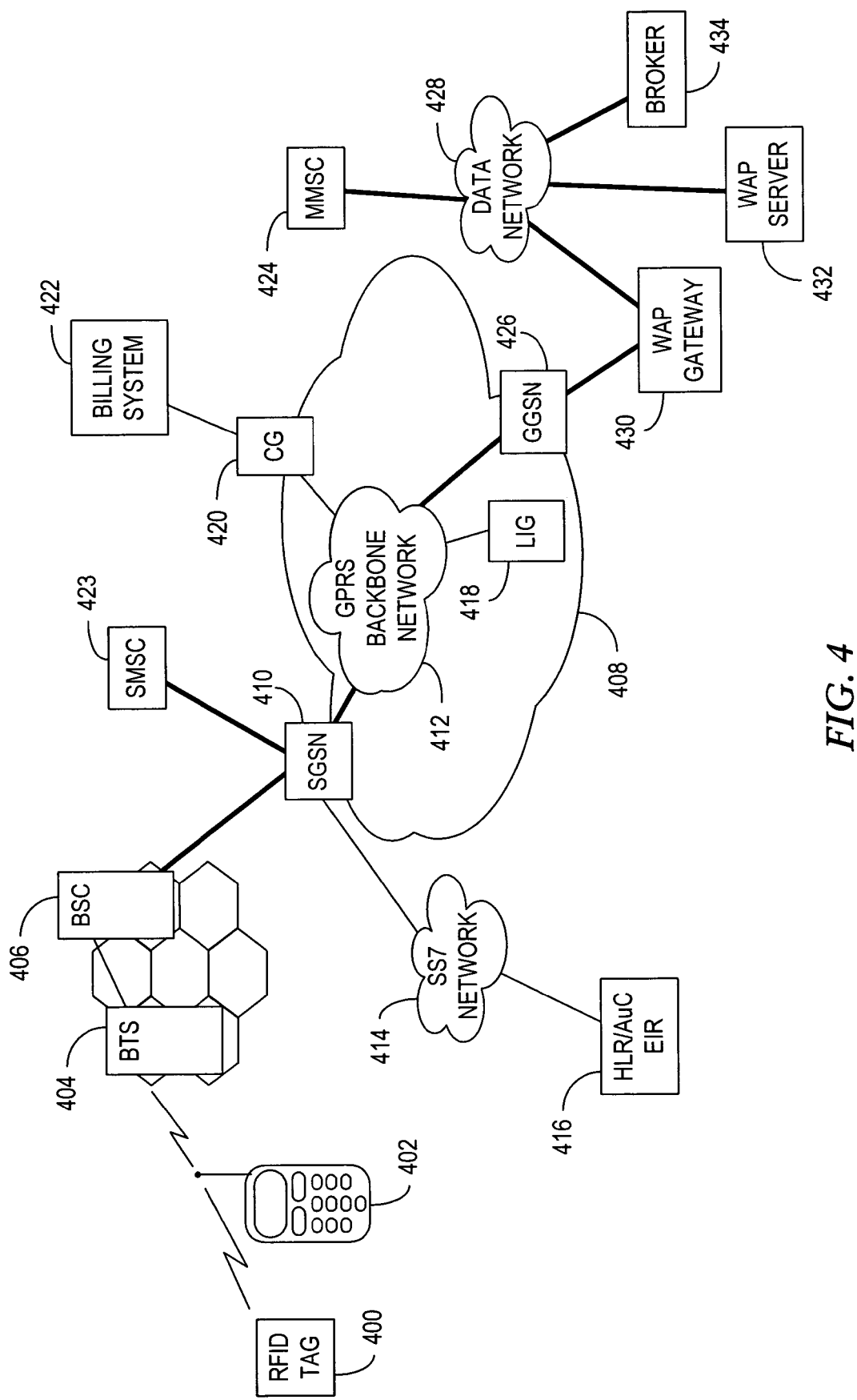
FIG. 4 is a diagram illustrating an exemplary embodiment of a system-level implementation of RFID-based service initiation of message services including SMS, EMS, and MMS.

FIG. 4 is a diagram illustrating an exemplary embodiment of a system-level implementation of RFID-based service initiation of message services including SMS, EMS, and MMS. These service types involve communication with an operator network after the mobile terminal has communicated with the RFID tag and obtained the tag content. As described in connection with FIG. 2, the RFID tag 400 may provide an SMS, MMS, etc. service initiation response to the mobile terminal 402 that has come within a certain proximity of the tag 400. The tag information is read into the mobile terminal 402 via its reader, and the reader application invokes the appropriate SMS, MMS, etc. application based on the identifier provided by the tag 400. The SMS/MMS application will then need to communicate with the operator network in order to receive the message corresponding to the SMS/MMS invitation.

Figure 5:
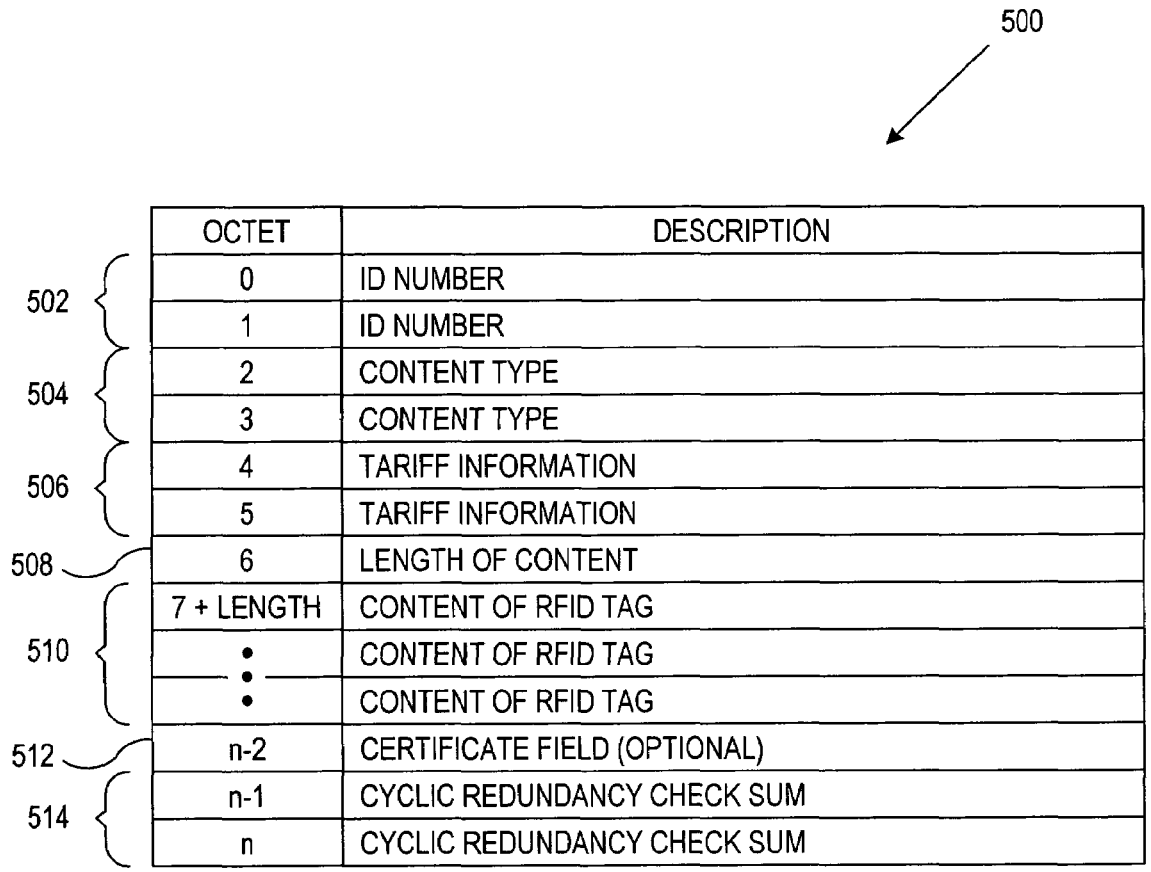
FIG. 5 illustrates a general diagram of an exemplary tag information block.

The SMS/MMS embodiment described herein is applicable in any number of network systems. For purposes of illustration and not of limitation, FIG. 4 is described in the context of a General Packet Radio System (GPRS) mobile communications network. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIGS. 4 and 5 are generally described in connection with GPRS, and GSM which is the underlying digital technology of GPRS, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 4, the mobile terminal 402 communicates with the base transceiver station (BTS) 404 via an air interface. The BTS 404 is a component of the wireless network access infrastructure that terminates the air interface over which subscriber traffic is communicated to and from the mobile terminal 404. The Base Station Controller (BSC) 406 is a switching module that provides, among other things, handoff functions, and controls power levels in each BTS 404. The BSC 406 controls the interface between a Mobile Switching Center (MSC) (not shown) and BTS 404 in a GSM wireless network 408, and thus controls one or more BTSs in the call set-up functions, signaling, and in the use of radio channels. The BSC 406 also controls the interface between the Serving GPRS Support Node (SGSN) 410 and the BTS 404 in a GPRS network 412.

The Serving GPRS Support Node (SGSN) 410 serves GPRS mobile by sending or receiving packets via a Base Station Subsystem (BSS), and more particularly via the BSC 406 in the context of GSM systems. The SGSN 410 is responsible for the delivery of data packets to and from the mobile terminals 402 within its service area, and performs packet routing and transfer, mobility management, logical link management, authentication, charging functions, etc. In the exemplary GPRS embodiment shown in FIG. 4, the location register of the SGSN 410 stores location information such as the current cell and Visiting Location Register (VLR) associated with the terminal 402, as well as user profiles such as the International Mobile Subscriber Identity Number (IMSI) of all GPRS users registered with this SGSN 410.

The SGSN 410 may also connect to a Signaling System 7 (SS7) network 414, which is a system on the Public Switched Telephone Network (PSTN) that performs out-of-band signaling in support of the call establishment, billing, routing, and information exchange functions of the PSTN. The SS7 network 414 communicates with network elements such as an Authentication Center (AuC), Home Location Register (HLR), Equipment Identity Register (EIR), etc., collectively shown at block 416. The network 408 may include other network elements, such as a Lawful Interception Gateway (LIG) 418 that allows authorities to intercept GPRS mobile data calls, and a Charging Gateway (CG) 420 that serves as an intermediary with various Operations Support Systems (OSS) elements such as charging and billing systems 422.

An SGSN 410 is ultimately coupled to a Short Message Service Center (SMSC) 423 and/or Multimedia Message Service Center (MMSC) 424 in connection with the presently described embodiment. While GSM forms the underlying technology, the SGSN 410 described above is a network element introduced through GPRS technology. Another network element introduced in the GPRS context is the Gateway GPRS Support Node (GGSN) 426, which acts as a gateway between the GPRS network 412 and a packet switched public data network, such as network 428. This gateway 426 allows mobile subscribers to access the public data network 428 or specified private IP networks. The connection between the GGSN 426 and the public data network 428 is generally enabled through a standard protocol, such as the Internet Protocol (IP), and further may be coupled through a WAP gateway 430.

With the aforementioned network system described as a representative network environment, the SMS/MMS physical browsing embodiment is now described. The content portion provided by the RFID tag 400 is read to the mobile terminal 402, which in turn invokes an MMS or SMS application that sends an SMS message and premium SMS number to the service provider. In the case of inviting an SMS message, the SMS will ultimately be delivered by the SMSC 423 to the mobile terminal 402. In the case of inviting an MMS message, an SMS message may notify the user of the MMS message which can be read at the mobile terminal 402 via a browser, such as a WAP browser. In either case, the content of the message received via the SMSC 423 or MMSC 424 can include advertisements, entertainment, ticket information, etc.

In the case where the RFID tag 400 identifies a WAP browser as the targeted application and provides a URL as content, the mobile terminal 402 will initiate the WAP browser and transmit the URL to the network. In one embodiment, the mobile terminal 402 may include a preset WAP gateway address for the WAP gateway 430 to connect to the specified URL at the WAP server 432. The RFID tag 400 could, in some embodiments, also provide the WAP gateway address.

In the case where the RFID tag 400 identifies an application to generate an ONS request and provides a UPC or EPC as the content, the mobile terminal 402 will issue such a request to the network. In one embodiment, the mobile terminal 402 may include a preset WAP gateway address of the WAP gateway 430, or the RFID tag 400 may also provide the WAP gateway address. The mobile terminal 402 uses this address to connect to a broker site 434 identified by a first URL that may be provided with the tag 400 content, where the UPC/EPC is converted to a second URL based on the subscription of service or other predetermined parameter. The information is then obtained using the second URL from the WAP server 432.

The manner in which the identifiers and content is provided to the mobile terminal reader may vary in accordance with the present invention. For example, variations of existing protocols may be used, such as the smart messaging protocol described above in connection with RFID tags providing stand-alone content, or the Narrow Band Socket (NBS) protocol. Tag data can therefore be provided in an extended NBS format where, in addition to standard NBS fields, other information associated with the present invention may be provided such as service type (e.g., SMS, MMS, WAP, etc.), tariff classes (e.g., free, fee-based, etc.), RFID content lengths, as well as the content itself. FIG. 5 illustrates a general diagram of an exemplary tag information block 500, which may be implemented as shown or as a basis in connection with other known formats or protocols in order to provide the requisite information from the RFID tag to the mobile terminal reader.

In the exemplary embodiment of FIG. 5, the information block 500 includes the identifier 502 used to identify an application on the mobile terminal that is to be initiated. In the illustrated embodiment, two bytes of information are reserved for the identifier (ID NUMBER). One embodiment includes providing a content type 504, which defines the type of content that is provided via the RFID tag. For example, the content types may include SMS, MMS, URL for use with WAP browsing, Java program download request and/or Java programs (e.g., MIDlets), UPC/EPC, smart message, and the like. Each of these and other content types can be identified via the content type field 504.

Where fees may be associated with a service request, the RFID information block 500 may include tariff information 506. For example, a 00H may represent that there is no associated cost. The remaining possible values are of a tariff class (or undefined) to be set by the service operator, where the actual cost may be printed visually on the RFID tag. The actual price need not be stored on the RFID tag, but rather just the tariff class. By providing tariff information 506 within the RFID tag, a user can selectively put his/her mobile terminal into a mode where fee-based services will not be used. Companies who provide mobile terminals to their employees may also find this to be quite beneficial. This also provides the user with the option of selecting a threshold cost that is willing to be paid, such as a 1 Euro limit. In this manner, RFID tags identifying a fee can automatically be identified at the mobile terminal as being within or outside of the predefined limit. The fee information can ultimately be displayed to the user via the mobile terminal display. Such limits may be based on information other than cost that is provided with the tag information 500, such as the content type itself. The mobile terminal can, for example, reject certain graphics or images where the user does not want to store memory-intensive content. Other parameters not shown in FIG. 5 that enable the user to set certain limits or thresholds may also be provided via an RFID tag.

The tag information block 500 may also include a content length field 508, which indicates the length of the content 510 portion of the tag information. Representative types of content that can be included as content 510 in the tag information 500 have been previously described. An optional certificate field 512, illustrated as one octet but of any desired length, may be provided. This field 512 may be used, for example, to provide an electronic signature to guarantee authenticity of the service provider, from which the user may access the public key location and verify the signature based on Public Key Infrastructure (PKI) policies. A check sum field, such as Cyclic Redundancy Check (CRC) field 514, may also be provided with the tag information 500. The CRC information may be used to determine whether errors occurred in connection with the reading of the tag information 500. Other and/or different information may also be provided, as the present invention contemplates any number of different tag content types, formats, fields, etc.

Figure 6:
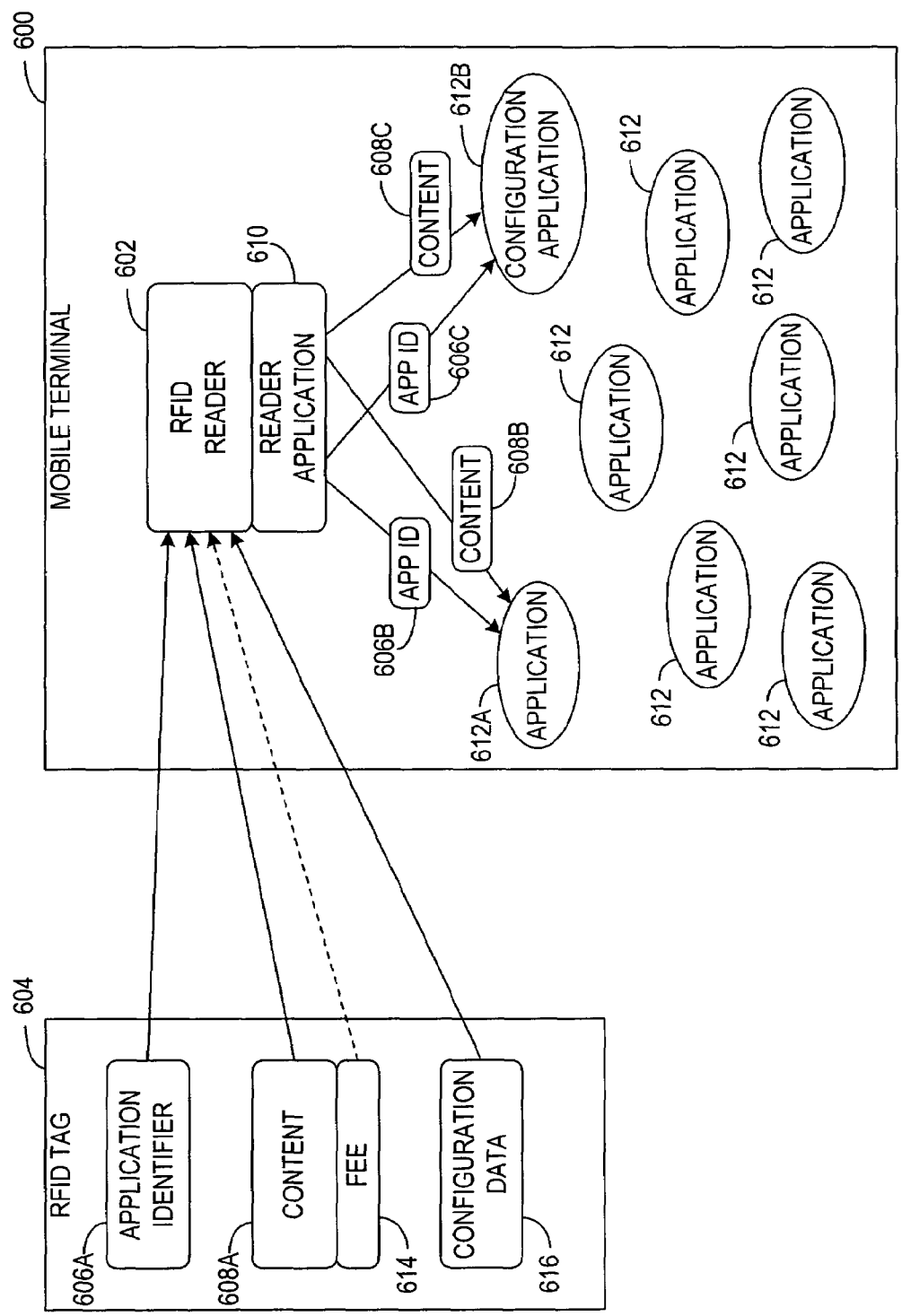
FIG. 6 is a block diagram illustrating exemplary manners in which RFID identifiers and content as described above are used by a mobile terminal reader and reader application to invoke a particular application and initiate the corresponding action.

FIG. 6 is a block diagram illustrating exemplary manners in which RFID identifiers and content as described above are used by a mobile terminal reader and reader application to invoke a particular application and initiate the corresponding action. The mobile terminal 600 includes an RFID reader 602, which receives information from the RFID tag 604. As previously described, the RFID tag 604 may be an active or passive tag. Assuming a passive tag 604, the mobile terminal 600 will initiate a signal that is recognized by the tag 604 when the mobile terminal 600 is within a certain distance of the tag 604. The tag 604 will respond with at least an application identifier (ID) 606A and some form of content 608A.

The RFID reader 602 receives the application ID 606A and content 608A, such as via a receiver or transceiver. A reader application 610 receives the application ID and content from the reader 602, and invokes one (or more) of a plurality of potential applications 612. It is also possible that only one application resides on the mobile terminal. Using the application ID 606B, the appropriate application 612 can be invoked, such as the SMS application 612A. The associated content 608B is also provided for use by the application 612A. Each application 612 is uniquely identified so that the correct application 612 may be invoked using the application ID 606B. The "content" as used in connection with FIG. 6 may include other information such as fee information 614, as described in connection with FIG. 5.

In another embodiment, the content provided is in the form of configuration data 616. The RFID reader 602 receives the application ID 606A and the configuration data 616, and provides this information to the reader application 610. In turn, the reader application invokes the appropriate configuration application 612B using the application ID 606C and the content/configuration data 608C. Again, the application ID 608C uniquely identifies the appropriate application resident on the mobile terminal 600, or otherwise accessible to the mobile terminal 600.

Figure 7:
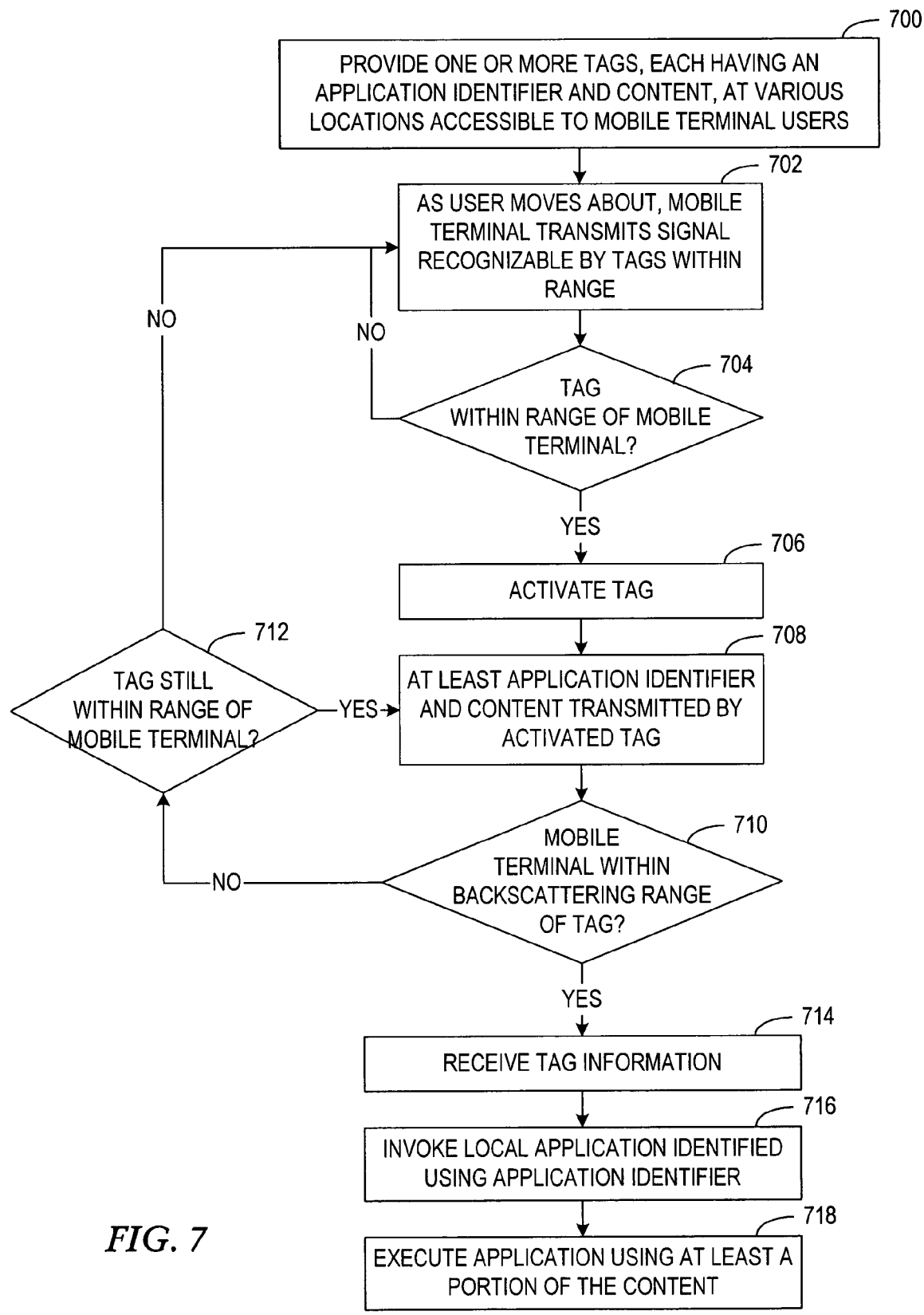
FIG. 7 is a flow diagram of an exemplary method for locating information via physical browsing by a mobile terminal in accordance with the present invention.

FIG. 7 is a flow diagram of an exemplary method for locating information via physical browsing by a mobile terminal in accordance with one embodiment of the present invention. One or more tags are provided 700, where each tag includes an application identifier and associated content. These tags can be provided at various locations that are accessible to mobile terminal users. As the user physically moves about with his/her mobile terminal, the mobile terminal can continuously, periodically, or at manually or automatically designated times transmit 702 a signal that is recognizable by the tags within the range of the signal. If a particular tag is within this range as determined at decision block 704, the tag is activated 706, and at least the application identifier and the content is transmitted 708 by the activated tag.

Because the transmission range of the mobile terminal and the backscattering range of the tag are not necessarily the same, it is determined 710 whether the mobile terminal is within the backscattering range of the tag. If not, the backscattering range may be less than the range of the mobile terminal, or the user may have moved out of range. If the tag is not still within range of the mobile terminal as determined at decision block 712, this would indicate that the user has moved away from the tag, and the process returns to block 702. If the tag is still within the range of the mobile terminal, the application identifier and content are transmitted 708 by the activated tag until the mobile terminal comes within the backscattering range. When the mobile terminal receives 714 the tag information, a local application identified using the application identifier is invoked 716. The application is executed 718 using at least a portion of the content provided by the tag, as previously set forth in the description herein.

While the present invention may be used to locate information and services and described above, it is well suited for other implementations as well. One such implementation involves a manner of facilitating network communications by way of a mobile device, where reader/transponder technology is used to facilitate the initiation and/or carrying out of network connections. In one particular embodiment, reader/transponder technology in accordance with the present invention may be implemented as a home (or other environment) aid, such as might be used by the elderly, children, or other individuals seeking ease of establishing network connections.

For example, healthcare costs continue to rise, and the aging population will fuel this cost increase. Current trends that aim to cut costs and to improve the quality of care and quality of life of persons in this class include home care and self care. In one embodiment of the invention, the person/patient can initiate and be involved in network communications by touching their radio frequency (RF) reader device to a transponder that is labeled for easy identification by the user. In accordance with the present invention, information stored at the transponder can be provided to the RF reader device, where that information can then be used to initiate a wireless service(s). For example, a photograph or label identifying the user's health care provider may be positioned proximate a transponder that includes an application identifier and other contact information. When the user touches (or otherwise comes within range of) the transponder with the RF reader device, the application identifier (ID) and contact information is transmitted to the RF reader device. An appropriate application module can then be identified by the application ID to invoke a particular communication function, i.e., a wireless service such as a Short Message Service (SMS) service. The contact information or other content may provide the SMS address, or alternatively this information may be provided via the user's RF reader-equipped mobile terminal. The content may also include a defined message to the health care provider. Upon receiving the application ID and other content, the mobile device can initiate the SMS service and provide the defined message to the contact address. In this manner, the user need only position his/her RF reader-equipped mobile device proximate a tag that identifies the desired communication function (e.g., a particular message to a health care provider via SMS messaging in the instant example) in order to perform the desired communication function.

FIG. 8 is a block diagram illustrating representative examples in which a visual representation may be associated with one or more transponders or tags. Example 800A illustrates an item 802, such as a poster, photograph, document, or other material on which a visual representation may be applied. Such item may be positioned completely or at least partially over the transponder 804. When an RF reader device (not shown) is positioned proximate the item 802, information can be transmitted from the transponder 804 to the reader device. For purposes of this description, positioning the reader device proximate the transponder 804 to receive information involves positioning the reader device within a distance of the item such that the transponder 804 can sufficiently receive any triggering or carrier signal from the reader device and sufficiently provide the information to the reader device in response thereto. Example 800B illustrates another example, where the function-identifying item 806 is not positioned over the transponder 808, but rather is positioned adjacent to at least some extent. In some embodiments, the identifying item 802, 806 may be temporarily or permanently affixed to the transponder 804, 808. For example, the identifying item may include text and/or an image on the side facing the user, and an adhesive or other affixing means on the opposite side such that it may be temporarily or permanently attached to the transponder. Example 800C illustrates yet another example, where the transponder 810 itself integrally includes an image and/or text and/or other indicia representing the communication function associated with that transponder.

It should be noted that the representation of the communication function associated with a transponder may be any type of media, including but not limited to one or more of textual indicia, images, photographs, physical indicia perceivable by touch (e.g., Braille), sound (e.g., high frequency beep represents "call daughter via cellular" communication function, etc.) and other such media representations.

FIG. 9 illustrates a representative group 900 of communication function devices that may be used, for example, by a person in their home to initiate and/or carry out wireless network communications. In the illustrated embodiment, it is assumed that radio frequency identifier (RFID) technology is employed, whereby at least some of the transponders are RFID tags. It is also assumed that the particular tag group 900 is used for a person who may be in a home care or self care situation. In the illustrated embodiment, the tag group 900 includes a plurality of tags and associated visual communication function identifiers. More particularly, one such visual communication function identifier may be an item 902 having an image imprinted or otherwise applied thereto. The image associated with item 902 is depicted as a "first aid" symbol. Such an image may be recognized and/or memorized by the user as the indicia associated with the communication function to "call for nursing care." A tag 904 is associated with the item 902, where the tag 904 includes at least some of the information required to initiate and/or execute the call for the nursing care. For example, the representative tag 904 may include a memory to store information such as an application identifier (ID) and other content. When an RFID reader is positioned proximate the item 902 and consequently within a transmission range of the active or passive tag 904, an application ID and other content may be provided to the RFID reader. As a more particular example, the application ID may be received by the RFID reader, and provided to a mobile device (which also houses the RFID reader) to identify the appropriate application to perform the call. In this example, the call may be a cellular telephone connection, such that the application ID identifies a telephony application. Content such as the recipients telephone number may be provided by the tag 904 as content. In this manner, the user may simply position his/her mobile device proximate the item 902 and tag 904, whereby a cellular connection to a predetermined nursing care facility/person is automatically established.

Items 906 and 910 illustrate other examples of such calling functions. Item 906 may include, for example, a visual representation of the person's daughter. Such a visual representation may be any representation identifying the person's daughter, such as the daughter's name, image, photograph, any other indicia recognizable by the user as being associated with the user's daughter, or any combination thereof. An RFID tag 908 is again associated with such an item 906. In this example, the application ID may again direct a mobile phone or other mobile device to establish a cellular telephony connection, but in this case the content provided by the tag 908 may include one or more contact numbers for the daughter (e.g., home phone number, cellular phone number, etc.). Item 910 illustrates another example where a transportation identifier (e.g., taxi cab) is depicted, which is associated with its own tag 912. Activation of tag 912 may, for example, establish a cellular telephone call with a taxi cab company or other transportation facility.

Rather than a call, the application ID could alternatively trigger other mobile device applications, such as an e-mail client. A defined e-mail may be sent, or alternatively one of a plurality of pre-defined e-mails may be selected to be transported to a destination network element. Other examples of communication functions include Short Message Service (SMS), Multimedia Message Service (MMS), Push-to-Talk (PTT) service, and the like. For example, any type of message may be initiated using the tags in accordance with the present invention. More particularly, item 914 provides a text identifier for "assistance needed." Item 914 is associated with tag 916 that may include, for example, an application ID for an SMS application on the mobile device to initiate an SMS service. Content on the tag 916 may include the message content itself, and/or the SMS destination address. The tag 916 may thus provide an application ID to invoke an SMS, MMS, or other messaging application at the mobile terminal to send a message to a nursing home to indicate that assistance is needed. For example, if an elderly person was feeling ill, the person could position their RFID reader-equipped mobile device proximate the "assistance needed" item 914, thereby causing the tag 916 to send information to the mobile device such that the mobile device sends an SMS message to the nursing home requesting assistance.

Various types of messages may be transmitted in such a fashion. For example, item 918 may provide an "everything OK" message to one or more network recipients when the user positions the mobile device proximate the item 918 and tag 920. Thus, it may be determined by the expected recipients that a problem exists if such message is not received within a predetermined time duration, by a predetermined time, etc. Other illustrated healthcare-related examples involve medications. For example, item 922 may represent text identifying that a first medication has been taken. Additional representative items 924 may also be used, such as an image 924. These items 922, 924 are associated with a tag 926, which ultimately causes a message to be sent to the person's nurse(s) to verify that the person has taken a required medicinal dose. Additional items 928, 930 and tags 932 may be used for other medications, or alternatively a single item/tag may be used for all medications.

The particular items, communication functions, images, etc. shown in FIG. 9 are provided for purposes of illustration only. Any type of item bearing a media representation identifying a desired communication function may be implemented. The embodiment of FIG. 9 is particularly beneficial in the context of health care and/or for use by persons who benefit from the ease of establishing communications in this manner, and for any other persons who may simply appreciate the ease of establishing communications in this manner.

Figure 10:
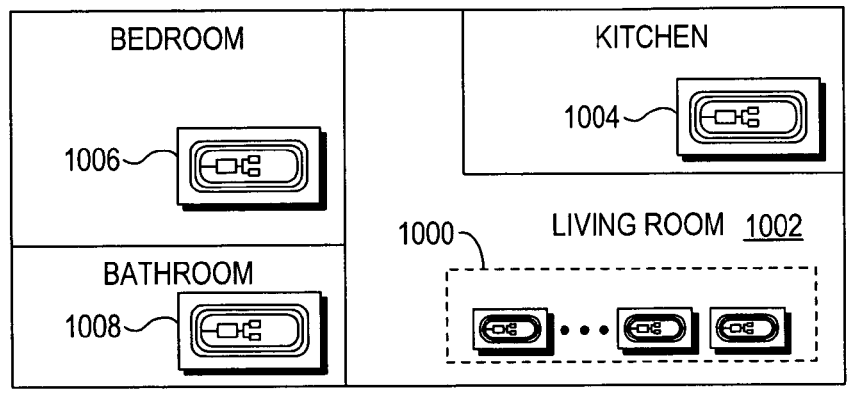
FIG. 10 illustrates an example of how a user may utilize RF tags to establish network communication in his/her home.

It should also be noted that where multiple tags are utilized, they may be positioned at any location beneficial to the user. FIG. 10 illustrates an example of how a user may utilize the present invention in his/her home. A group 1000 of items/tags may be positioned in the person's living room 1002. Such items/tags may include those used primarily for social purposes, such as calling a relative, friend, transportation, etc. Other items/tags 1004, 1006, 1008 may be positioned in other rooms of the house. For example, tags configured to initiate an emergency message/call may be placed in multiple rooms of the house.

It should also be noted that the particular facility in which such tags are used may be any location where it is beneficial or convenient to the user. For example, in the home care or self care situation for the elderly, the tags may be most beneficial at the person's residence. However, such tag configurations may be used on other locations, such as a person's office, automobile, etc. For example, a handicapped person may utilize such devices in his/her office to facilitate establishing wireless telephone calls. As another example, such tags could be used in an automobile to allow users to touch/point to a tag to automatically dial a destination, without having to manipulate the numbers on the keyboard which may be difficult while driving.

Figure 11:
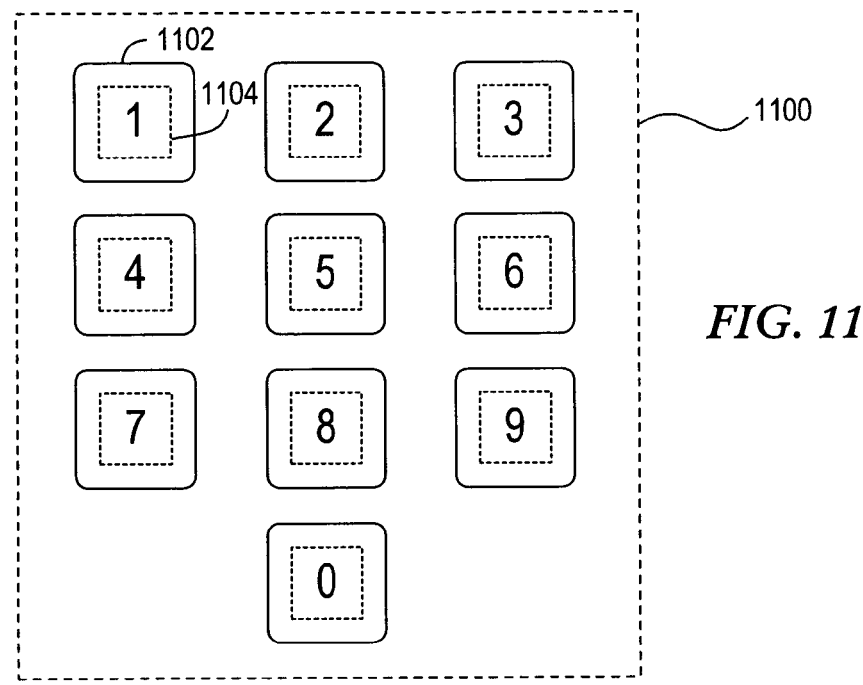
FIG. 11 is a block diagram illustrating a representative manner in which a mobile device user interface (UI) may be replaced or augmented using RF tags set in an external configuration in accordance with the present invention.

In accordance with another embodiment of the invention, built-in input devices of the mobile device user interface (UI) may be replaced or augmented with a generic touching or pointing device and a number of programmable elements set in an external configuration. More particularly, the externalized UI elements may be implemented as RF tags and the generic touching/pointing device may be implemented as a reader device. In such an embodiment, RF reader-equipped mobile devices such as mobile phones may be sold together with certain RF tags. In one example, the RF tags have digits or other indicia of the mobile phone keyboard. For example, one tag may have an item depicting the number "1" of the keyboard, and the corresponding tag includes transmittable information corresponding to a keyboard value of "1"; another item depicts the number "2" of the keyboard and that corresponding tag includes a keyboard value of "2", and so forth. An example of this is depicted in FIG. 11, where a keyboard UI 1100 is emulated using RFID tags. For example, the keyboard UI tag 1102 is associated with a first tag 1104 having information corresponding to the digit "1." Similar item/tag arrangements are provided for other digits of the keyboard 1100. Such a configuration is beneficial, for example, for an elderly person who may have impaired vision and/or has difficulty in manipulating the keys of the mobile device. In this manner, the digits can be selected from these digit-specific RFID tags associated with the tag-based keyboard 1100. By touching (or otherwise bringing within wireless transmission range) the item having the desired number with the reader device (e.g., RFID reader-equipped mobile phone), that digit can essentially be "dialed" on the mobile device. By providing such tags with the mobile device, an easy-to-use UI is essentially emulated using RF technology.

It should be noted that any hardware, graphical, or other UI available on the mobile device may be provided in this fashion. For example, a mobile phone may include a graphical user interface (GUI) that provides selectable menu items. Any one or more of such selectable menu items may also be provided via an RF tag implementation, thereby allowing the mobile device user to point/touch the RF reader-equipped mobile device to the tag(s) corresponding to the desired menu items. Again, this makes possible the selection of mobile device UI elements without having to manipulate the keys on the mobile device, which may be difficult for the elderly, children, handicapped individuals, and the like.

Figure 12:
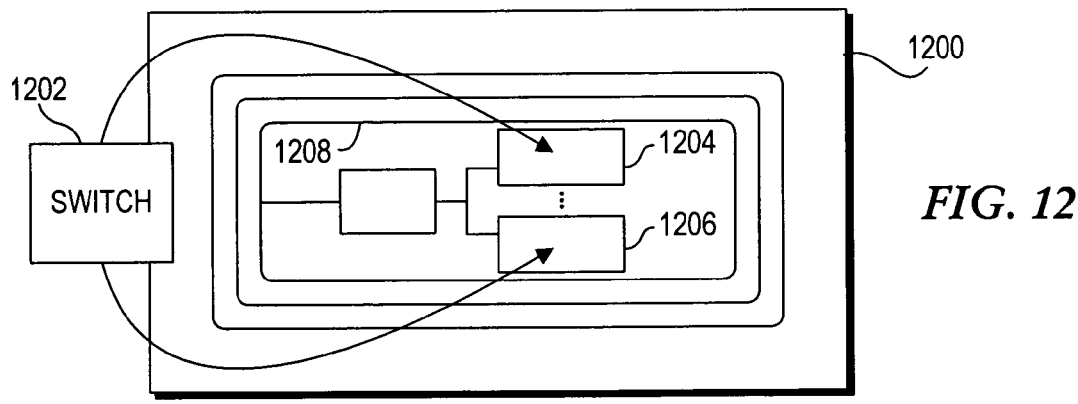
FIG. 12 is a block diagram illustrating one embodiment of a tag having information associated with multiple communication functions which may be performed.

The transponders or tags used in connection with the present invention may be pre-programmed with the desired application identifiers, and if applicable, additional content. In one embodiment of the invention, multiple application identifiers and/or content may be programmed into a tag. In one embodiment, this can allow multiple communication functions to be performed via the mobile device. In another embodiment, the desired communication function may be selected by the user. FIG. 12 illustrates one such embodiment, where the tag 1200 includes a switch 1202 to allow the user to select which one or more of a plurality of application IDs and/or content to be provided by the tag 1200. For example, a single memory device may be partitioned such that activation of the switch 1202 causes the appropriate memory partition to become active. In another embodiment, multiple memory devices 1204, 1206 may be implemented, whereby activation of the switch selects the appropriate memory device 1204, 1206. The antenna circuit 1208 including the antenna coil and processing circuitry can provide the information associated with the selected memory device. In this manner, tags may be preconfigured for multiple communication functions.

Figure 13:
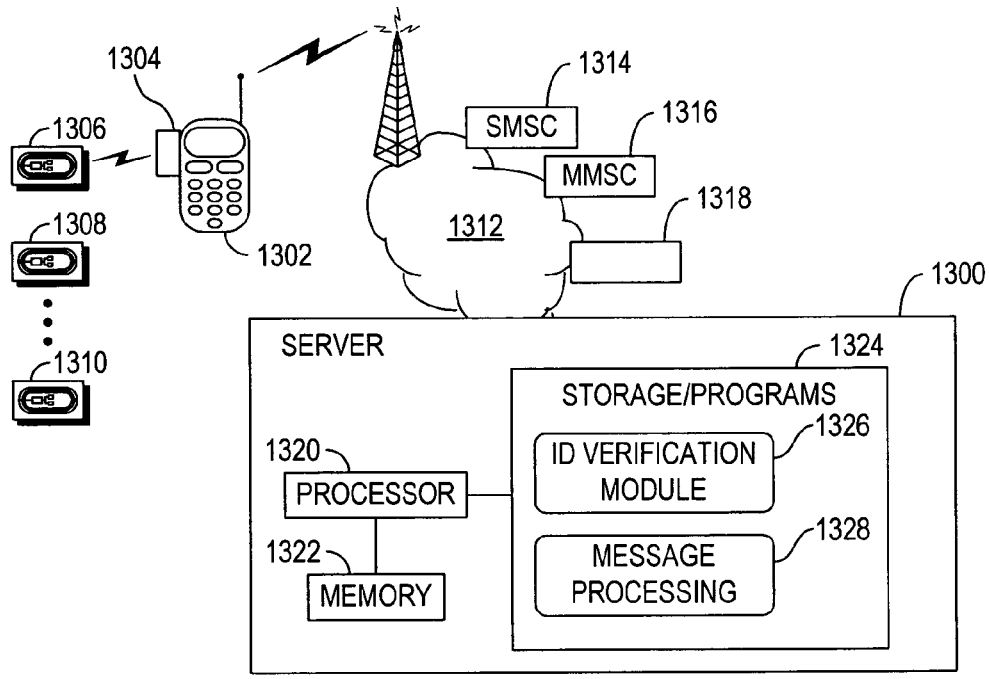
FIG. 13 is a block diagram illustrating one embodiment of the invention where a network element is used to manage messages.

FIG. 13 is a block diagram illustrating one embodiment of the invention where a network server 1300 or similar network element is used to manage messages. In the illustrated embodiment, a mobile device such as a mobile phone 1302 is equipped with an RF reader 1304 that can receive information from one or more tags 1306, 1308, 1310. The mobile phone 1302 receives the application ID (and content if applicable), and activates the appropriate service application on the mobile phone 1302. For example, an SMS, MMS, cellular telephony, or other network service application may be invoked on the mobile phone 1302. The network service application in turn may send an over-the-air (OTA) message or otherwise establish an OTA connection with a network 1312. In accordance with one embodiment of the invention, the messages are sent to the server 1300 in order to manage the action requirements. For example, the server may be configured to monitor for receipt of a message, call, etc. from the mobile phone 1302. If an expected message/call is not received within a predetermined time, by a predetermined time, or in response to another predetermined event, the server 1300 can automatically send a message or initiate some type of connection to notify someone of this fact. For example, if no message from the mobile phone 1302 user is received at a certain time, the server 1300 can send a message to a health care provider or other such service provider, a family member, a neighbor, or the like to prompt someone to check on the person. In such a case, the message may be sent to a SMS Center (SMSC) 1314, MMS Center (MMSC) 1316, or other destination network element including servers, mobile devices, desktop computers, or other communication device coupled to the network 1312.

The server 1300 may include a processor 1320, memory 1322, storage/programs 1324, as well as other standard server components used to communicate via the network 1312. In one embodiment, server 1300 software is used to authenticate or otherwise prove a personal ID, as depicted by the ID verification module 1326. Personal ID information may be stored in a SIM (not shown) associated with the mobile device 1302 or may be stored locally within the mobile device. Other software, such as the message processing module 1328, can be used to determine other factors such as the urgency of the information, whether a message has been received by a predetermined time, etc.

Figure 14:
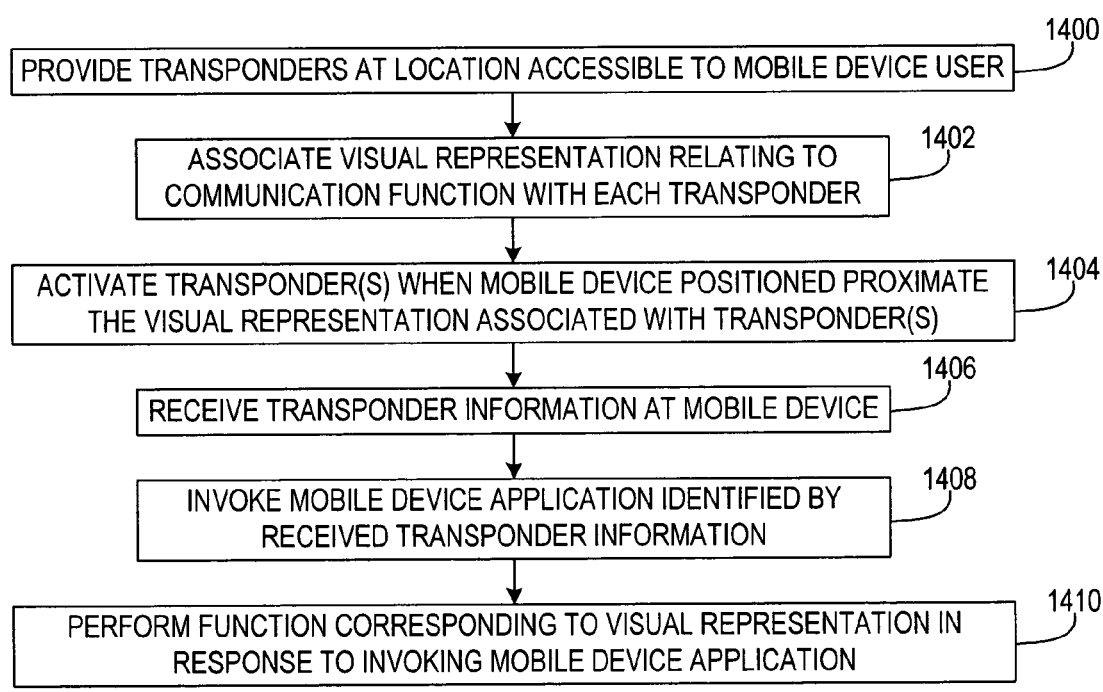
FIGS. 14 and 15 are flow diagrams illustrating embodiments of methods for initiating services in accordance with the present invention.

FIG. 14 is a flow diagram illustrating one embodiment of a method for initiating services in accordance with the present invention. In the illustrated embodiment, transponders such as RFID tags are provided 1400 at a location(s) accessible to the mobile device user. For example, where the present invention is used in the context of home/self care, such tags may be provided on a table, wall, wheelchair, or other location convenient to the user. A visual representation relating to a particular communication function is associated 1402 with each of the tags. For example, a poster, picture, photograph, text, or other such representation may be attached or positioned with its respective tag. A particular tag is activated 1404 when the mobile device is positioned proximate the visual representation associated with that tag. The information provided by the tag is received 1406 at the mobile device, where this information is used to identify an application to be invoked 1408 at the mobile device. A communication function corresponding to the selected visual representation is then performed 1410 in response to invoking the application. For example, if the visual representation indicates to "call daughter," the communication function may be to establish a cellular telephone connection between the mobile device and a mobile or landline telephone operated by the user's daughter.

Figure 15:
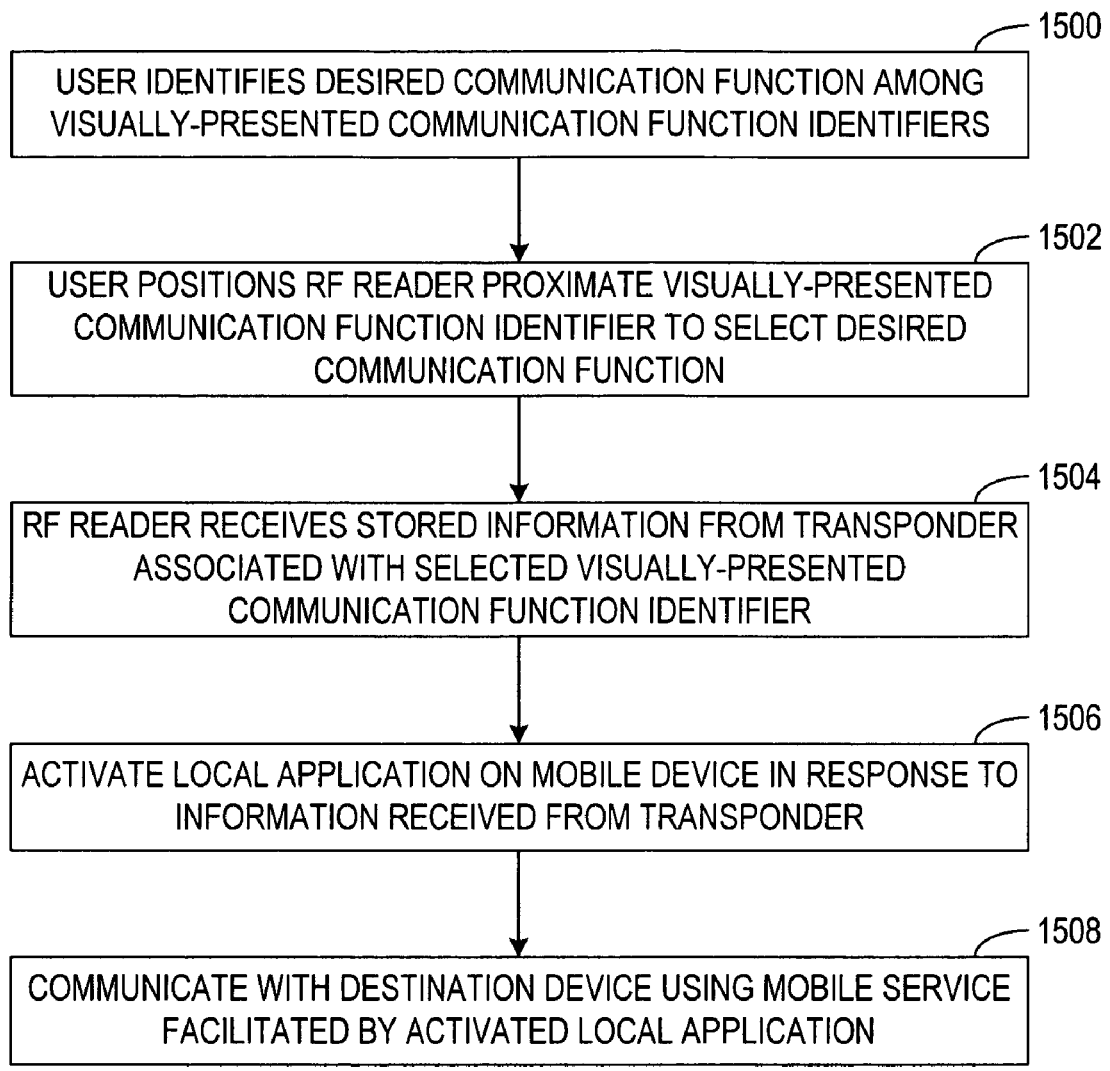

FIG. 15 is a flow diagram illustrating an embodiment of a method for communicating over a network via a mobile device equipped with an RF reader. The user identifies 1500 the desired communication function among one or more visually-presented communication function identifiers, e.g., posters, pictures, text, etc. As shown at block 1502, the user positions the mobile device, and consequently the RF reader device, proximate the communication function identifier in order to select the desired communication function. The RF reader receives 1504 the stored information from the corresponding tag, and a local application on the mobile device is activated 1506 in response to the information received from the tag. The user then communicates 1508 with a destination device using a mobile service facilitated by the activated local application. It should be noted that the local application need not perform all of the service functions, and in some embodiments may call upon other local or remote programs to perform the service.

Figure 16:
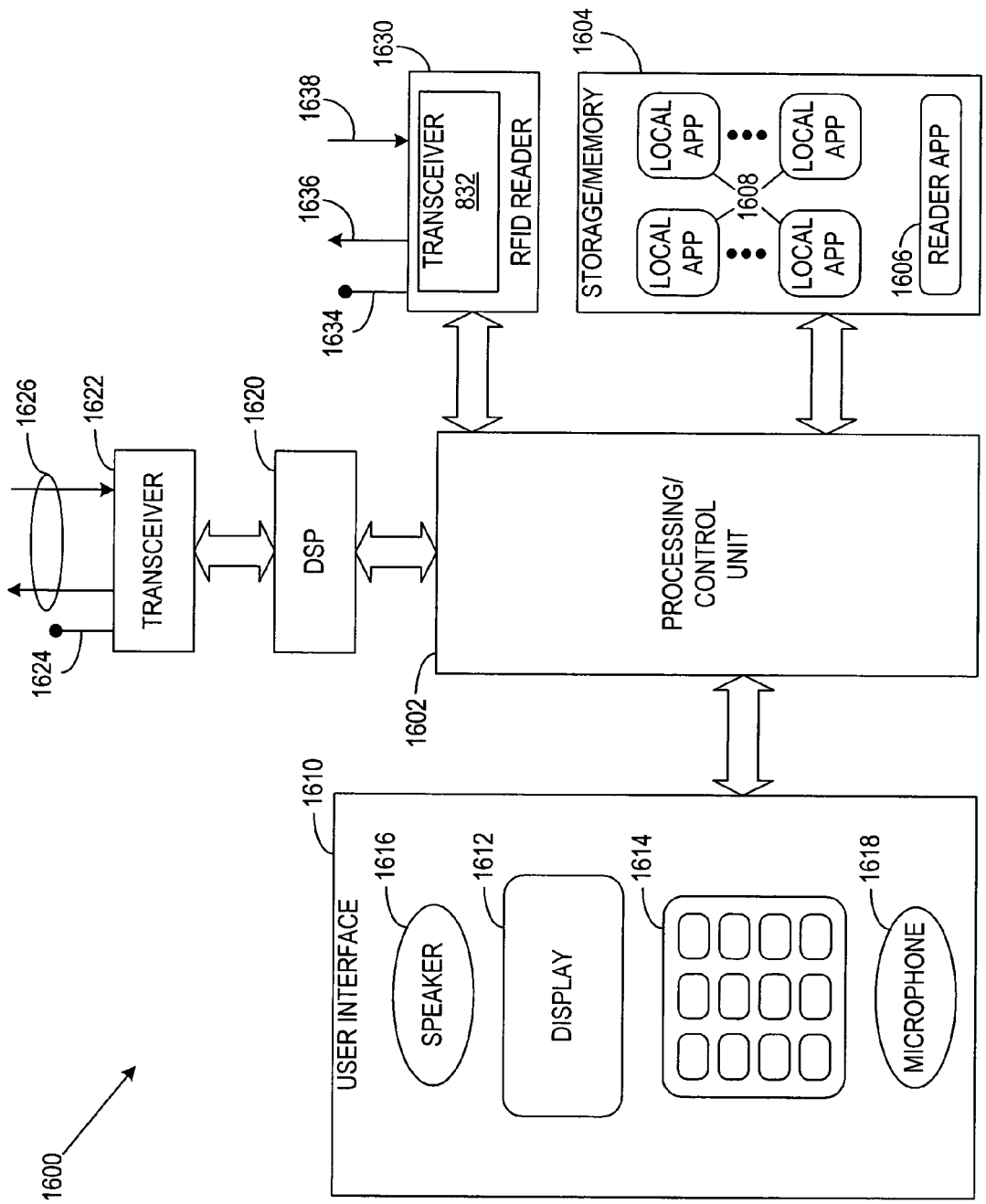
FIG. 16 illustrates a representative mobile terminal computing system capable of carrying out operations in accordance with the invention.

The mobile terminals described in connection with the present invention may be any number of wireless devices incorporating user profile information, such as wireless/cellular telephones, personal digital assistants (PDAs), or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various functions, display presentations and operations described herein. An example of a representative mobile terminal computing system capable of carrying out operations in accordance with the invention is illustrated in FIG. 16.

The exemplary mobile computing arrangement 1600 suitable for performing the operations in accordance with the present invention includes a processing/control unit 1602, such as a microprocessor, reduced instruction set computer (RISC), or other central processing module. The processing unit 1602 need not be a single device, and may include one or more processors. For example, the processing unit may include a master processor and associated slave processors coupled to communicate with the master processor.

The processing unit 1602 controls the basic functions of the mobile terminal as dictated by programs available in the program storage/memory. Thus, the processing unit 1602 executes the functions associated with the physical browsing aspects of the present invention. More particularly, the program storage/memory 1604 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The physical browsing modules associated with the present invention, such as the reader application 1606 and local applications 1608 that may be identified by application identifiers and invoked, may also be transmitted to the mobile computing arrangement 1600 via data signals, such as being downloaded electronically via a network, such as the Internet and intermediary wireless networks.

The program storage/memory 1604 may also be used to store data, such as the content provided by an RFID tag. In one embodiment of the invention, the content is stored in non-volatile electrically-erasable, programmable ROM (EEPROM), flash ROM, etc. so that the content is not lost upon power down of the mobile terminal.

The processor 1602 is also coupled to user-interface 1610 elements associated with the mobile terminal. The user-interface 1610 of the mobile terminal may include, for example, a display 1612 such as a liquid crystal display, a keypad 1614, speaker 1616, and microphone 1618. These and other user-interface components are coupled to the processor 1602 as is known in the art. The keypad 1614 includes alpha-numeric keys for performing a variety of functions, including dialing numbers and executing operations assigned to one or more keys. For example, in accordance with the present invention, various functions associated with the network communications may be initiated and/or carried out by using the keypad 1614. Alternatively, other user-interface mechanisms may be employed, such as voice commands, switches, touch pad/screen, graphical user interface using a pointing device, trackball, joystick, or any other user interface mechanism.

The mobile computing arrangement 1600 may also include a digital signal processor (DSP) 1620. The DSP 1620 may perform a variety of functions, including analog-to-digital (A/D) conversion, digital-to-analog (D/A) conversion, speech coding/decoding, encryption/decryption, error detection and correction, bit stream translation, filtering, etc. The transceiver 1622, generally coupled to an antenna 1624, transmits and receives the radio signals 1626 between the wireless device and the network.

In connection with the present invention, the mobile computing arrangement 1600 includes an RFID reader device 1630, which includes a transceiver 1632 and an antenna 1634. The reader 1630 transmits signals 1636 which can be recognized by tags, thereby activating the tags. In response, the tags provide tag information signals 1638, including the application identifier and content, which are provided to the reader application 1606. The reader application determines which of the local applications 1608 is to be invoked, based on the application identifier. The reader application 1606 also provides the content to the appropriate application 1608, once the appropriate application 1608 has been identified. It should be recognized that the transceiver 1622 used to establish wireless connections between the mobile device and the network can be used as the transceiver 1632 associated with the RFID reader 1630. However, because the transmissions performed with the network are high-frequency signals relative to the RF signals used in connection with the RFID reader 1630, it may not be practical or possible to share the transceiver, although it is possible in some implementations.

The mobile computing arrangement 1600 of FIG. 16 is provided as a representative example of a computing environment in which the principles of the present invention may be applied. From the description provided herein, those skilled in the art will appreciate that the present invention is equally applicable in a variety of other currently known and future mobile computing environments. For example, the physical browsing software modules in accordance with the present invention may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, it will be apparent to those skilled in the art from the foregoing description that the, invention is equally applicable to other current or future radio frequency identification technologies using, for example, electromagnetic/electrostatic coupling, and thus the present invention is not limited to "RFID" technology as this term is currently used. It is intended that the scope of the invention be limited not with this detailed description, but rather determined by the claims appended hereto.

What is claimed is:

1. A method comprising:

activating at least one transponder having information associated therewith via a wireless interrogation signal with a reader device, wherein the at least one transponder is associated with a visual representation for a user of the device that identifies at least one user application to be invoked at the device upon machine-reading the associated at least one transponder to perform a function identified by the visual representation;

receiving the associated information from the activated transponder in response to the wireless interrogation signal;

invoking the user application at the device, identified at least in part by the information received from the activated transponder; and performing the function identified by the visual representation associated with the activated transponder in response to execution of the invoked user application.

2. The method as in claim 1, wherein the at least one transponder is associated with a visual representation by associating at least a text message with at least one of the transponders, wherein the text message identifies the function associated with the respective transponder.

3. The method as in claim 1, wherein the at least one transponder is associated with a visual representation by associating at least an image with at least one of the transponders, wherein the image identifies the function associated with the respective transponder.

4. The method as in claim 1, wherein the at least one transponder is associated with a visual representation by positioning an item including the visual representation proximate its associated transponder.

5. The method as in claim 1, wherein the at least one transponder is associated with a visual representation by integrating the visual representation with its associated transponder.

6. The method as in claim 1, wherein the associated information comprises at least an application identifier to identify the user application to be invoked.

7. The method as in claim 1, wherein the associated information comprises content for use by the invoked user application in performing the function.

8. The method as in claim 1, wherein the associated information comprises at least an application identifier to identify the user application to be invoked, and content for use by the identified user application in performing the function.

9. The method as in claim 1, wherein activating at least one of the transponders comprises activating the transponder in response to the device being positioned within a wireless transmission range between a reader device associated with the device and the transponder.

10. The method as in claim 9, further comprising enhancing the wireless transmission range by providing a separate power source at the transponder.

11. The method as in claim 1, wherein the transponders comprise radio frequency identification (RFID) tags and the wireless interrogation signal comprises an RFID signal.

12. The method as in claim 11, wherein receiving the associated information from the activated transponder comprises receiving the associated information from the activated transponder by way of RFID backscattering.

13. A method comprising:
associating a visual representation for a user with one or more transponders having information associated therewith, wherein each visual representation identifies a targeted recipient of at least one person-to-person, communication function to be performed by a device upon machine-reading the associated transponder;
activating at least one of the transponders via a wireless interrogation signal;
receiving the associated information from the activated transponder in response to the wireless interrogation signal;
invoking an application, identified at least in part by the information received from the activated transponder, wherein the application relates to the visual representation associated with the activated transponder;
performing the communication function identified the visual representation associated with the activated transponder in response to execution of the invoked application; and
establishing, in response to the invoked mobile application, an over-the-air (OTA) connection to a network.

14. The method as in claim 13, wherein the invoked application comprises a Short Messaging Service (SMS) application, and wherein establishing an OTA connection to the network comprises transmitting an SMS push request, based at least in part on the content, to the network.

15. The method as in claim 13, wherein the invoked application comprises a Multimedia Messaging Service (MMS) application, and wherein establishing an OTA connection to the network comprises transmitting an MMS push request, based at least in part on the content, to the network.

16. The method as in claim 13, wherein the invoked application comprises a mobile telephony application, and wherein establishing an OTA connection to the network comprises establishing via the network a mobile telephony connection between the device and one or more destination devices identified by the information provided by the respective transponder.

17. The method as in claim 13, wherein the invoked application comprises a push-to-talk (PIT) application, and wherein establishing an OTA connection to the network comprises establishing via the network a PIT connection between the device and one or more destination devices identified by the information provided by the respective transponder.

18. The method as in claim 13, wherein the invoked application comprises a Java download application, and wherein establishing an OTA connection to the network comprises transmitting a Java MIDlet request, based at least in part on the information provided by the transponder, to the network.

19. A method comprising:
identifying at least one desired communication function among one or more visually-presented communication function identifiers for a user that visually communicate a targeted recipient of the communication function, wherein each of the visually-presented communication function identifiers is associated with at least one transponder storing information thereon;
selecting the desired communication function in response to positioning an RF reader proximate the corresponding visually-presented communication function identifier and consequently within a transmission range of the transponder associated with the desired communication function;
receiving the stored information from the transponder at a device via the RF reader;
activating at least one local application on the device in response to the stored information, wherein the local application performs a communication function relating to the visually-presented communication function identifier; and
communicating with at least one destination network element over the network using a mobile service facilitated by the activated local application.

20. The method as in claim 19, further comprising positioning the one or more visually-presented communication functions within the device user's residence at one or more locations available to the device user.

21. The method as in claim 19, wherein the desired communication function comprises requesting health-related assistance, and wherein communicating with at least one destination network element comprises at least one of sending a message to or establishing a communication session with a designated health care facility.

22. The method as in claim 19, wherein the desired communication function comprises requesting transmission of at least one message to the at least one destination network element, and wherein communicating with at least one destination network element comprises sending a message over the network to the at least one destination network element.

23. The method as in claim 22, wherein sending a message over the network comprises any of sending an SMS message, an MMS message, and a Push-to-Talk (PTT) message to the at least one destination network element.

24. The method as in claim 22, wherein requesting transmission of at least one message comprises requesting transmission of at least one message to the at least one destination network element indicating acknowledgement of user consumption of a medicinal dose.

25. The method as in claim 22, wherein requesting transmission of at least one message comprises requesting transmission of at least one message to the at least one destination network element to request assistance.

26. The method as in claim 19, wherein activating at least one local application on the device comprises activating at least one of an SMS application, an MMS application, and a PTT application.

27. The method as in claim 19, wherein the desired communication function comprises initiating a telephony session with the at least one destination network element, and wherein communicating with the at least one destination network element comprises communicating between the device and the destination network element via a cellular network.

28. The method as in claim 19, further comprising recognizing, at an intermediary network element, a failure of the communication with the destination network element within a designated time period or by a designated time, and communicating information by the intermediary network element to one or more network destinations indicating the failure of the communication with the destination network element.

29. A method comprising:
providing one or more radio frequency identification (RFID) tags each associated with media having a visual representation for a user identifying a user application to be invoked on a device upon machine-reading the respective RFID tag to perform a function identified by the visual representation;
activating at least one RFID tag in response to an RFID activation signal;
receiving at least an application identifier and content from the activated RFID tag at the device when the device is within a backscatter transmission range of the RFID tag;
locating a local application on the device using the application identifier, wherein the local application corresponds to the user application identified by the media and associated with its respective RFID tag;
providing the content to the local application; and
executing the local application using at least a portion of the content to perform the function identified by the media associated with the activated RFID tag.

30. The method as in claim 29, further comprising selecting at least one of the functions to be performed in response to positioning the device proximate the media associated with the RFID tag of the function.

31. The method as in claim 29, wherein the media comprises any one or more of textual indicia, one or more images, photographs, physical indicia perceivable by touch, and sound.

32. The method as in claim 29, further comprising configuring the visual representations associated with the one or more RFID tags to correspond to user interface elements of the device, and wherein executing the local application to perform the function comprises emulate a user input function based on the content received at the device.

33. The method as in claim 32, wherein the visual representations associated with the one or more RFID tags are configured to correspond to at least one of a graphical user interface (GUI) menu of the device and to physical keyboard elements of the device.

34. A system comprising:
one or more transponders associated with one or more items, each item having a visual representation for a user identifying a user application to be invoked on a device upon machine-reading the associated transponder to perform a function identified by the visual representation;
a device configured to be operable by a user, comprising:
a radio frequency reader module comprising a transceiver configured to send activation signals recognizable by the one or more transponders, and to receive at least an application identifier and content in response to one of the transponders being activated by the activation signals when the device is positioned proximate the item associated with that transponder;
a memory configured for storing one or more local applications and a reader application; and
a processor coupled to the memory and the radio frequency reader module, wherein the processor is configured to invoke at least one of the local applications corresponding to the user application visually represented by the transponder and identified by the application identifier received from the transponder and to provide the content to the identified local application as directed by the reader application, thereby performing the function identified by the visual representation associated with the activated transponder via the network.

35. The system as in claim 34, wherein the one or more transponders emulate at least a portion of a graphical user interface (GUI) available on the device.

36. The system as in claim 35, wherein the one or more transponders emulate one or more of a GUI menu, GUI navigation indicia, and GUI links.

37. The system as in claim 34, wherein the one or more transponders emulate at least a portion of a hardware user interface available on the device.

38. The system as in claim 37, wherein the one or more transponders emulate a numeric keypad available on the device, and wherein the items associated with the transponders each depict a numeral of the numeric keypad available on the device.

39. A transponder device comprising:
a visual identifier for a user configured to visually depict a targeted recipient of a person-to-person communication function to be performed by a device upon machine-reading the transponder device;
a memory configured to store information including at least an application identifier relating to the visually depicted communication function;
an antenna circuit configured to receive a carrier signal from an RF reader device when the RF reader device is positioned proximate the visual identifier such that the RF reader device is within an RF communication range of the transponder device, and to transmit at least the application identifier via a backscattered signal to the RF reader device to enable an application identified by the application identifier to perform the visually depicted communication function.

40. The transponder device as in claim 39, wherein the visual identifier comprises a representation of the communication function embodied on an item positioned to associate the item with the transponder device.

41. The transponder device as in claim 39, wherein the transponder device comprises a selectable switch to facilitate selection of the application identifier and content to be provided by the transponder.

42. An apparatus comprising:
a radio frequency reader configured to transmit an interrogation signal, and in response to the signal, to receive a radio frequency signal including information to invoke a specific application when the apparatus is positioned within a signal range of a transponder associated with a visual representation for a user identifying a targeted recipient of at least one person-to-person communication function to be performed by the apparatus upon reading the associated transponder;
a processor configured to invoke the identified application upon receiving the information from the transponder, and to perform the at least one communication function identified by the visual representation upon execution of the invoked application.

43. Computer-readable media having instructions stored thereon which are executable by a processing system by performing:
receiving a radio frequency signal and obtaining therefrom application identification information;

invoking at least one application identified by the received application identification information, wherein the application relates to a visual representation for a user of that identifies a targeted recipient of a type of over-the-air connection for person-to-person communications, wherein the visual representation is associated with a device that originates the radio frequency signal; and establishing the over-the-air connection to a network in response to invoking the at least one application, and performing a function identified by the visual representation associated with a source of the radio frequency signal and involving the type of over-the-air connection to the network.

44. The computer-readable media of claim 43, wherein the visual representation identifies one of a Short Messaging Service, a Multimedia Messaging Service, Push to Talk, voice telephony, and a Java MIDlet request.

45. The transponder device as in claim 39, wherein the visual identifier further visually depicts one of a Short Messaging Service, a Multimedia Messaging Service, Push to Talk, voice telephony, and a Java MIDlet request.

46. An apparatus comprising:

a transponder having information associated therewith and a visual representation for a user of a device, wherein the visual representation identifies a user application to be invoked at the device to perform a function identified by the visual representation upon machine-reading the transponder, wherein the transponder is configured to be activated via a wireless interrogation signal sent from the device, and wherein the associated information comprises an application identifier to identify the user application to be invoked, and content for use by the identified user application in performing the function, and wherein the transponder sends the associated information to the device in response to the wireless interrogation signal to invoke a local application at the device corresponding to the user application and identified by the application identifier to perform the function identified by the visual representation.

47. The apparatus as in claim 46, wherein the function identified by the visual representation comprises establishing person-to-person communications with a targeted recipient identified by the visual representation.

48. The apparatus as in claim 47, wherein establishing person-to-person communications with a targeted recipient comprises communicating with a designated health care facility.

49. The apparatus as in claim 46, wherein the function identified by the visual representation comprises indicating acknowledgement of user consumption of a medicinal dose.

50. The apparatus as in claim 46, wherein the function identified by the visual representation comprises a user input function, and wherein the local application performs the user input function based on the content of the associated information sent to the device.

* * * * *